United States Patent
Whelan et al.

(10) Patent No.: US 10,730,206 B2
(45) Date of Patent: Aug. 4, 2020

(54) PROCESS FOR FORMING THERMOPLASTIC VULCANIZATES AND THERMOPLASTIC VULCANIZATES MADE THEREFROM

(71) Applicant: ExxonMobil Chemical Patents Inc., Baytown, TX (US)

(72) Inventors: Declan Whelan, Rugby (GB); Stephen F. Roche, CWMBRAN Torfaen (GB); Porter C. Shannon, Seabrook, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 329 days.

(21) Appl. No.: 15/543,156

(22) PCT Filed: Dec. 10, 2015

(86) PCT No.: PCT/US2015/065048
§ 371 (c)(1),
(2) Date: Jul. 12, 2017

(87) PCT Pub. No.: WO2016/137556
PCT Pub. Date: Sep. 1, 2016

(65) Prior Publication Data
US 2018/0009135 A1    Jan. 11, 2018

Related U.S. Application Data (60) Provisional application No. 62/121,223, filed on Feb. 26, 2015.

(51) Int. Cl.
| | | |
|---|---|---|
| *C08L 23/16* | (2006.01) | |
| *B29C 35/02* | (2006.01) | |
| *C08K 3/16* | (2006.01) | |
| *C08L 23/12* | (2006.01) | |
| *C08L 23/14* | (2006.01) | |

(52) U.S. Cl.
CPC ............... *B29C 35/02* (2013.01); *C08K 3/16* (2013.01); *C08L 23/12* (2013.01); *C08L 23/14* (2013.01); *C08L 23/16* (2013.01)

(58) Field of Classification Search
CPC .......... C08L 23/12; C08L 23/14; C08L 23/16; C08K 3/16
See application file for complete search history.

(56) References Cited

U.S. PATENT DOCUMENTS

| 4,311,628 A | 1/1982 | Abdou-Sabet et al. |
|---|---|---|
| 9,422,408 B2 * | 8/2016 | Roche .................... B29C 48/04 |
| 2007/0083007 A1 | 4/2007 | Jacob |
| 2007/0129493 A1 | 6/2007 | Sahnoune et al. |
| 2007/0282073 A1 | 12/2007 | Weng et al. |
| 2008/0299397 A1 * | 12/2008 | Kenens ................. C08F 255/02 |
| | | 428/412 |
| 2011/0160402 A1 | 6/2011 | Roche et al. |
| 2013/0041090 A1 * | 2/2013 | Ono ......................... C08J 3/201 |
| | | 524/509 |

FOREIGN PATENT DOCUMENTS

| GB | 1312608 A | | 4/1973 |
|---|---|---|---|
| GB | 2455981 A | | 7/2009 |
| GB | 2489123 A | | 9/2012 |
| GB | 2510930 | * | 8/2014 |
| GB | 2510930 A | | 8/2014 |
| WO | 2011/081746 A | | 7/2011 |

* cited by examiner

Primary Examiner — Robert C Boyle (57) ABSTRACT

Provided are methods for producing a thermoplastic vulcanizate and thermoplastic vulcanizates provided therein. The method includes introducing vulcanizable rubber, thermoplastic resin, a masterbatch of a propylene-based elastomer and a cure accelerator for a phenolic resin curative to the reactor, and phenolic resin curative to a reactor and dynamically vulcanizing the rubber with the phenolic resin curative in the presence of the cure accelerator and the thermoplastic resin.

13 Claims, 2 Drawing Sheets

PROCESS FOR FORMING THERMOPLASTIC VULCANIZATES AND THERMOPLASTIC VULCANIZATES MADE THEREFROM

PRIORITY CLAIM

This application is a National Phase Application claiming priority to PCT Application Serial No. PCT/US2015/065048 filed Dec. 10, 2015, and claims priority to and the benefit of U.S. Ser. No. 62/121,223, filed Feb. 26, 2015, the entirety of which are hereby incorporated by their reference.

FIELD OF THE INVENTION

Described herein are methods for making thermoplastic vulcanizates and thermoplastic vulcanizates made therefrom.

BACKGROUND OF THE INVENTION

Thermoplastic vulcanizates ("TPVs") comprise blends of dynamically cured rubbers and thermoplastic resins where the rubber is dispersed within the thermoplastic resin phase as finely-divided rubber particles. TPVs have advantageously demonstrated many of the properties of thermoset elastomers, yet are processable as thermoplastics. As such, elastomeric articles are often extruded from TPVs using thermoplastic extruding techniques.

TPVs have been prepared by dynamically vulcanizing the rubber in the presence of a curative, such as a phenolic resin, while the rubber is being mixed with a thermoplastic resin. Often cure accelerators or activators are used to aid in the vulcanization process. For example, U.S. Pat. No. 4,311,628 illustrates TPVs that are produced using phenolic resin cure systems that include a phenolic curing resin and a cure accelerator, such as stannous chloride.

Stannous chloride is a solid material and is supplied in the form of a powder. The powder can be difficult to handle and is not easily metered into the reactors where dynamic vulcanization takes place. For example, powdered stannous chloride is hygroscopic and has a tendency to compact and clump if exposed to moisture in the air. Further compaction can occur within the feeder which can result in inconsistent addition of the stannous chloride to the extruder and fouling or plugging of the feeder. In such cases, removal of blockages within the feeder may result in stoppage of the TPV production line or may require a new feeder. Additionally, the powdered stannous chloride can be difficult to disperse throughout the blend of the rubber and thermoplastic resin. Uneven dispersion of the stannous chloride into the TPV production process can affect the cross-linking of the rubber phase during vulcanization.

There is a need for methods of making TPVs that minimize or eliminate issues arising from the addition of powdered cure accelerators, and a method which increases the consistency of the addition of cure accelerators to the vulcanization process. There is also a need to provide methods of making TPVs that have more consistent cure.

GB Patent Nos. 2455981 B1 and 2489123 B1, GB Patent Application Publication No. 2510930, and GB Patent Application No. 1312608, describe masterbatches of stannous chloride and polypropylene.

PCT Publication No. WO 2011/081746 has attempted to overcome some of these difficulties by supplying the stannous chloride to the vulcanization process as a masterbatch with polypropylene. However, there can still be uneven dispersion of the stannous chloride within the rubber phase.

SUMMARY OF THE INVENTION

Provided herein are compositions comprising propylene-based elastomers and cure accelerators, such as stannous chloride. The propylene-based elastomer comprises propylene-derived units and 5 to 30 wt % of α-olefin-derived units and has a melting temperature of less than 120° C. and a heat of fusion of less than 75 J/g;

Also described herein are processes for making thermoplastic vulcanizates utilizing the compositions comprising propylene-based elastomers and cure accelerator. The process may comprise the steps of (a) introducing a vulcanizable rubber to a reactor; (b) introducing a thermoplastic resin to the reactor; (c) introducing a masterbatch comprising a propylene-based elastomer and a cure accelerator to the reactor, (d) introducing a phenolic resin curative to the reactor; and (e) dynamically vulcanizing the rubber with the phenolic resin curative in the presence of the cure accelerator and the thermoplastic resin.

DETAILED DESCRIPTION OF ILLUSTRATIVE EMBODIMENTS

Described herein are thermoplastic vulcanizates ("TPVs") that are prepared by a dynamic vulcanization process where the cure accelerator is delivered to the vulcanization process as part of a preformed blend, i.e., a masterbatch, that comprises the cure accelerator and a propylene-based elastomer. The use of the masterbatch helps protect the cure accelerator from the moisture in the air. Likewise, the masterbatch may advantageously shield the stannous chloride from participating in undesirable side reactions until the time (i.e., during cure) when the cure accelerator is needed. Additionally, the use of the masterbatch can provide a more efficient method for metering more precise amounts of catalyst to the composition. Furthermore, it has unexpectedly been discovered that the use of the propylene-based elastomer as the carrier for the catalyst allows the catalyst to be more evenly dispersed throughout the vulcanizable composition and thereby effect a more efficient cure of the rubber. As a result of improved metering and possible protection from side reactions, the overall efficiency of the cure accelerator is believed to be improved thereby obviating the need to feed excess cure accelerator to the process, which is especially advantageous as related to large commercial processes where excess cure accelerator is often used.

As used herein, a "thermoplastic vulcanizate" or "TPV" is broadly defined as any material that includes a dispersed, at least partially vulcanized, rubber within a thermoplastic resin. A TPV composition can further include oil, additives, and combinations thereof.

As used herein, the term "vulcanizate" means a composition that includes some component (e.g., rubber) that has been vulcanized. The term "vulcanized" is defined herein in its broadest sense, and refers in general to the state of a composition after all or a portion of the composition (e.g., crosslinkable rubber) has been subjected to some degree or amount of vulcanization. Accordingly, the term encompasses both partial and total vulcanization. A preferred type of vulcanization is "dynamic vulcanization," discussed below, which produces a "vulcanizate." In at least that context, the term vulcanization encompasses any form of curing (crosslinking), both thermal and chemical, which can be utilized in dynamic vulcanization.

As used herein, the term "dynamic vulcanization" means vulcanization or curing of a curable rubber blended with a thermoplastic resin under conditions of shear at temperatures sufficient to plasticize the mixture. In preferred embodiments, the rubber is simultaneously crosslinked and dispersed as micro-sized particles within the thermoplastic resin. Depending on the degree of cure, the rubber to thermoplastic resin ratio, compatibility of the rubber and thermoplastic resin, the kneader type and the intensity of mixing (shear rate), other morphologies, such as co-continuous rubber phases in the plastic matrix, are possible.

As used herein, a "partially vulcanized" rubber is one wherein more than 5 weight percent (wt %) of the crosslinkable rubber is extractable in boiling xylene, subsequent to vulcanization (preferably dynamic vulcanization), e.g., crosslinking of the rubber phase of the TPV. For example, in a TPV comprising a partially vulcanized rubber at least 5 wt % and less than 20 wt %, or 30 wt %, or 50 wt % of the crosslinkable rubber is extractable from the specimen of the TPV in boiling xylene.

Preferably, the percent of soluble rubber in the cured composition is determined by refluxing a specimen in boiling xylene, weighing the dried residue and making suitable corrections for soluble and insoluble components based upon knowledge of the composition. Thus, corrected initial and final weights are obtained by subtracting from the initial weight of the soluble components, other than the rubber to be vulcanized, such as extender oils, plasticizers, and components of the compositions soluble in organic solvent, as well as thermoplastic components that are not intended to cure. Any insoluble pigments, fillers, etc., to are subtracted from both the initial and final weights. Any materials in the uncured rubber that are soluble in refluxing xylene are subtracted from the rubber when calculating the percent of soluble rubber in a cured composition. A further description of the technique for determining the percentage of extractable rubber is set forth in U.S. Pat. No. 4,311,628, and the portions of the patents referring to that technique are hereby incorporated by reference.

As used herein, a "fully vulcanized" (or fully cured or fully crosslinked) rubber is one wherein less than 5 wt % of the crosslinkable rubber is extractable in boiling xylene, subsequent to vulcanization (preferably dynamic vulcanization), e.g., crosslinking of the rubber phase of the TPV. For example, in a TPV comprising a fully vulcanized rubber less than 4 wt %, or less than 3 wt %, or less than 2 wt %, or less than 1 wt % of the crosslinkable rubber is extractable from the specimen of the TPV in boiling xylene. In some embodiments, in a TPV comprising a fully vulcanized rubber from 0.5 to 2.0 wt % of the crosslinkable rubber is extractable from the specimen of the TPV in boiling xylene.

Rubber Component

The TPVs described herein comprise a rubber component. The "rubber component" can comprise any material that is considered by persons skilled in the art to be a "rubber", preferably a crosslinkable rubber (i.e., prior to vulcanization) or crosslinked rubber (i.e., after vulcanization). The rubber component may comprise one rubber or may comprise blends of two or more rubbers, where the rubbers are different in composition or are the same in composition but have different properties.

Non-limiting examples of rubbers include olefin-containing rubbers, butyl rubber, natural rubber, styrene-butadiene copolymer rubber, butadiene rubber, acrylonitrile rubber, halogenated rubbers such as brominated and chlorinated isobutylene-isoprene copolymer rubber, butadiene-styrene-vinyl pyridine rubber, urethane rubber, polyisoprene rubber, epichlorohydrin terpolymer rubber, polychloroprene rubber, and mixtures thereof.

In some embodiments, the TPV comprises olefin-containing rubbers, such as ethylene-α-olefin copolymer rubbers. The ethylene-α-olefin rubber may contain an α-olefin having 3 to 8 carbon atoms, and in preferred embodiments the α-olefin is propylene. The ethylene-α-olefin rubber may contain at least 50 wt %, or at least 55 wt %, or at least 60 wt % of ethylene-derived units based on the weight of the ethylene-α-olefin rubber, with the balance of the units being α-olefin derived. Ethylene-α-olefin rubbers, such as ethylene-propylene rubbers are further described in U.S. Pat. No. 5,177,147.

In preferred embodiments, the rubber component comprises an ethylene-α-olefin-diene rubber. The ethylene-α-olefin-diene rubber may contain an α-olefin having 3 to 8 carbon atoms. In preferred embodiments the α-olefin is propylene, and the rubber is an ethylene-propylene-diene rubber ("EPDM"). Preferably the diene in the ethylene-α-olefin-diene rubber is a nonconjugated diene. Suitable nonconjugated dienes include 5-ethylidene-2-norbornene ("ENB"); 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene ("DCPD"); 5-vinyl-2-norbornene ("VNB"); divinyl benzene; or combinations thereof. In some embodiments, the ethylene-α-olefin-diene rubber comprises diene-derived units derived from ENB, VNB, or combinations thereof. In preferred embodiments, the ethylene-α-olefin diene rubber consists essentially of, or consists only of, units derived from ethylene, propylene, and ENB.

The ethylene-α-olefin-diene rubber may contain at least 50 wt %, or at least 55 wt %, or at least 60 wt % ethylene-derived units, based on the weight of the ethylene-α-olefin-diene rubber. The ethylene-α-olefin diene rubber may contain less than 95 wt %, or less than 90 wt %, or less than 85 wt %, or less than 75 wt %, or less than 70 wt % ethylene-derived units, based on the weight of the ethylene-α-olefin diene rubber. In some embodiments, the ethylene-α-olefin-diene rubber contains from 50 to 90 wt % ethylene-derived units, or from 50 to 85 wt %, or from 55 to 80 wt %, or from 55 to 75 wt %, or from 60 to 70 wt % ethylene-derived units, based on the weight of the ethylene-α-olefin-diene rubber, where desirable ranges may include ranges from any lower limit to any upper limit.

In the ethylene-α-olefin-diene rubber the diene-derived units may be present in an amount of at least 0.1 wt %, or at least 1 wt %, or at least 2 wt %, or at least 3 wt %, or at least 4 wt %, based on the weight of the ethylene-α-olefin-diene rubber. The ethylene-α-olefin-diene rubber may contain less than 10 wt %, or less than 9 wt %, or less than 8 wt %, or less than 7 wt %, or less than 6 wt % diene-derived units, based on the weight of the ethylene-α-olefin diene rubber. In some embodiments, the ethylene-α-olefin-diene rubber may contain from about 0.1 to about 10 wt %, or from about 1 to about 9 wt %, or from about 2 to about 8 wt %, or from about 3 to about 7 wt %, or from about 4 to about 6 wt % diene-derived units, based on the weight of the ethylene-α-olefin-diene rubber, where desirable ranges may include ranges from any lower limit to any upper limit.

The balance of the ethylene-α-olefin-diene rubber will generally be made up of units derived from α-olefins, such as propylene. Accordingly, the ethylene-α-olefin-diene rubber may contain at least 10 wt %, or at least 15 wt %, or at least 20 wt %, or at least 25 wt %, or at least 30 wt % α-olefin derived units, based on the weight of the ethylene-α-olefin-diene rubber. The ethylene-α-olefin-diene rubber may contain less than 50 wt %, or less than 45 wt %, or less than 40 wt %, or less than 35 wt %, or less than 30 wt %, or less than 25 wt % α-olefin derived units, based on the weight of the ethylene-α-olefin diene rubber. In some embodiments, the ethylene-α-olefin diene rubber may contain from about 10 to about 50 wt %, or from about 15 to about 45 wt %, or from about 20 to about 40 wt %, or from about 25 to about 35 wt % α-olefin derived units, based on the weight of the ethylene-α-olefin-diene rubber, where desirable ranges may include ranges from any lower limit to any upper limit.

In one or more embodiments, ethylene-α-olefin rubber or the ethylene-α-olefin-diene rubber may have a weight average molecular weight (Mw) that is greater than 100,000 g/mole, or greater than 200,000 g/mole, or greater than 400,000 g/mole, or greater than 600,000 g/mole. The Mw of the ethylene-α-olefin rubber or the ethylene-α-olefin-diene rubber may be less than 1,200,000 g/mole, or less than 1,000,000 g/mole, or less than 900,000 g/mole, or less than 800,000 g/mole. Useful ethylene-α-olefin rubbers and ethylene-α-olefin-diene rubbers may have a number average molecular weight (Mn) that is greater than 20,000 g/mole, or greater than 60,000 g/mole, or greater than 100,000 g/mole, or greater than 150,000 g/mole. The Mn of the ethylene-α-olefin rubber or the ethylene-α-olefin-diene rubber may be less than 500,000 g/mole, or less than 400,000 g/mole, or less than 300,000 g/mole, or less than 250,000 g/mole. Techniques for determining the molecular weight ($M_n$, $M_w$, and $M_z$) and molecular weight distribution (MWD) may be found in U.S. Pat. No. 4,540,753, which is incorporated by reference herein, and references cited therein and in *Macromolecules,* 1988, volume 21, p. 3360 by VerStrate et al., which is also herein incorporated by reference, and references cited therein.

The ethylene-α-olefin rubber or the ethylene-α-olefin-diene rubber may also be characterized by having a Mooney viscosity (ML(1+4) at 125° C.) per ASTM D-1646, of from about 10 to about 250, or from about 20 to about 100, or from about 30 to about 75, or from about 40 to about 60, where desirable ranges may include ranges from any lower limit to any upper limit. As used herein, Mooney viscosity is reported using the format: Rotor ([pre-heat time in min.]+[shearing time in min.] @ measurement temperature, ° C.), such that ML (1+4@125° C.) indicates a Mooney viscosity determined using the ML or large rotor according to ASTM D1646-99, for a pre-heat time of 1 minute and a shear time of 4 minutes, at a temperature of 125° C. In some embodiments, the ethylene-α-olefin rubber or the to ethylene-α-olefin-diene rubber is oil extended and the Mooney viscosity of the oil-extended rubber is from about 10 to about 250, or from about 20 to about 100, or from about 30 to about 75, or from about 40 to about 60, where desirable ranges may include ranges from any lower limit to any upper limit.

The ethylene-α-olefin rubber or the ethylene-α-olefin-diene rubber may be characterized by having an intrinsic viscosity, as measured in decalin at 135° C. per ASTM D-1601, of from about 1 to about 8 dl/g, or from about 3 to about 7 dl/g, or from about 4 to about 6.5 dl/g.

The ethylene-α-olefin rubber or the ethylene-α-olefin-diene rubber may be characterized by a glass transition temperature ($T_g$), as determined by Differential Scanning calorimetry (DSC) according to ASTM E-1356, that is less than −20° C., or less than −30° C., or less than −50° C., or from about −20 to about −60° C.

The ethylene-α-olefin and the ethylene-α-olefin-diene rubbers described herein may be manufactured or synthesized by using a variety of techniques. For example, these copolymers can be synthesized by employing solution, slurry, or gas phase polymerization techniques that employ various catalyst systems. Exemplary catalysts include Ziegler-Natta systems such as those including vanadium catalysts, and single-site catalysts including constrained geometry catalysts, or metallocene catalysts. Useful ethylene-α-olefin rubbers and ethylene-α-olefin-diene rubbers include some grades of rubbers commercially available under the tradenames Vistalon™ (ExxonMobil Chemical Co.; Houston, Tex.), Keltan™ (DSM Copolymers), Nordel™ IP (Dow), Nordel™ MG (Dow), Royalene™ (Lion Copolymer), and Buna™ (Lanxess).

The rubber component may be present in the TPV in an amount of from a low of about 10 wt %, 15 wt %, 20 wt %, or 25 wt % to a high of about 30 wt %, 35 wt %, 40 wt %, or 45 wt % based on total weight of the TPV composition, where desirable ranges may include ranges from any lower limit to any upper limit. In some embodiments, the rubber component may consist essentially of, or consist only of, ethylene-α-olefin-diene rubber, and the TPV may contain from a low of 20 wt %, 21 wt %, 22 wt %, 23 wt %, 24 wt % or 25 wt % to a high of about 29 wt %, 30 wt %, 31, wt %, 32 wt %, 33 wt %, 34 wt %, or 35 wt % of the ethylene-α-olefin-diene rubber, based on the weight of the total TPV, where desirable ranges may include ranges from any lower limit to any upper limit.

The rubber component may be present in the TPV in an amount of from a low of about 40 wt %, 45 wt %, or 50 wt % to a high of about 65 wt %, 70, wt %, 75 wt %, based on the total weight of the polymer content of the TPV, where the polymer content consists of the rubber component and the thermoplastic resin, where desirable ranges may include ranges from any lower limit to any upper limit. In some embodiments, the rubber component may consist essentially of, or consist only of, ethylene-α-olefin-diene rubber, and the TPV may contain from a low of about 45 wt %, 46 wt %, 47 wt %, 48 wt %, 49 wt %, or 50 wt % to a high of about 63 wt %, 64 wt %, 65 wt %, 66 wt %, 67 wt %, 68 wt %, 69 wt %, or 70 wt % of ethylene-α-olefin-diene rubber, based on the total amount of ethylene-α-olefin-diene rubber and thermoplastic resin in the TPV, where desirable ranges may include ranges from any lower limit to any upper limit.

Thermoplastic Component

The thermoplastic component of the TPV includes at least one olefinic thermoplastic resin. The "olefinic thermoplastic resin" may be any material that is not a "rubber" and is not a "propylene-based elastomer" as described herein. For example, the thermoplastic resin may be a polymer or polymer blend considered by persons skilled in the art as being thermoplastic in nature, e.g., a polymer that softens when exposed to heat and returns to its original condition when cooled to room temperature. The olefinic thermoplastic resin component may contain one or more polyolefins, including polyolefin homopolymers and polyolefin copolymers.

Illustrative thermoplastic resins may be prepared from mono-olefin monomers including, but not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof, and copolymers thereof. Preferably, the olefinic thermoplastic resin is unvulcanized or non cross-linked.

In preferred embodiments, the olefinic thermoplastic resin comprises, or consists of, polypropylene. The term "polypropylene" as used herein broadly means any polymer that is considered a "polypropylene" by persons skilled in the art and includes homo, impact, and random copolymers of propylene. Preferably, the polypropylene used in the TPVs described herein has a melting point above 110° C. and includes at least 90 wt % propylene-derived units. The polypropylene may also include isotactic, atactic or syndiotactic sequences, and preferably includes isotactic sequences. The polypropylene can either derive exclusively from propylene monomers (i.e., having only propylene-derived units) or comprises at least 90 wt %, or at least 93 wt %, or at least 95 wt %, or at least 97 wt %, or at least 98 wt %, or at least 99 wt % propylene-derived units, with the remainder derived from olefins, such as ethylene, and/or $C_4$-$C_{10}$ α-olefins.

The thermoplastic resin may have a melting temperature of at least 110° C., or at least 120° C., or at least 130° C., and may range from 110° C. to 170° C. or higher as measured by DSC.

The thermoplastic resin may have a melt flow rate "MFR" as measured by ASTM D1238 at 230° C. and 2.16 kg weight of from about 0.1 to 100 g/10 min. In some embodiments, the TPV comprises at least one thermoplastic resin having a fractional MFR, such a polypropylene having a fractional MFR of less than about 2 g/10 min, or less than about 1.5 g/10 min, or less than about 1 g/10 min. In some embodiments, the TPV may comprises a thermoplastic resin, such as a polypropylene, having a MFR of from a low of about 25, 26, 27, 28, 29, 30, 31, 32, or 33 g/10 min to a high of about 37, 38, 39, 40, 41, 42, 43, 44, or 45 g/10 min, where desirable ranges may include ranges from any lower limit to any upper limit. In some embodiments, the TPV may further comprise a thermoplastic resin, such as a polypropylene, having a MFR of from a low of about 5, 10, or 15 g/10 min to a high of about 20, 25, or 30 g/10 min, where desirable ranges may include ranges from any lower limit to any upper limit.

In some embodiments, the thermoplastic component may be present in the TPV composition in an amount of from a low of about 10 wt %, 11 wt %, 12 wt %, 13 wt %, 14 wt %, 15 wt %, 16 wt %, or 17, wt %, to a high of about 25 wt %, 26 wt %, 27 wt %, 28 wt %, 29 wt %, or 30 wt %, based on the weight of the TPV, where desirable ranges may include ranges from any lower limit to any upper limit.

The thermoplastic component may be present in the TPV in an amount of from a low of about 25 wt %, 30 wt %, or 35 wt % to a high of about 50 wt %, 54 wt %, or 40 wt %, based on the total weight of the polymer content of the TPV, where the polymer content consists of the rubber component and the thermoplastic component, where desirable ranges may include ranges from any lower limit to any upper limit.

Oil

The TPVs described herein further comprise oil, such as process oils and extender oils. As used herein, process oils are oils that are added directly to the vulcanization process, as compared to extender oils which are oils that are pre-blended with the rubber to extend the rubber prior to vulcanization.

The oils that may be used include hydrocarbon oils and plasticizers, such as organic esters and synthetic plasticizers.

Many additive oils are derived from petroleum fractions, and have particular ASTM designations depending on whether they fall into the class of paraffinic, naphthenic, or aromatic oils. Other types of additive oils include alpha olefinic synthetic oils, such as liquid polybutylene. Additive oils other than petroleum based oils can also be used, such as oils derived from coal tar and pine tar, as well as synthetic oils, e.g., polyolefin materials.

Oil can be present in the TPV in an amounts of from about 5 to about 300 parts, or from 30 to 250 parts, or from 70 to 200 parts, by weight per 100 parts by weight of total weight of the rubber component and thermoplastic component, where desirable ranges may include ranges from any lower limit to any upper limit.

In some embodiments, oil may be present in the TPV in an amount of from a low of about 10 wt %, or 15 wt %, or 20 wt %, or 25 wt %, or 30 wt %, to a high of about 40 wt %, or 45 wt %, or 50 wt %, or 55 wt %, based on the total weight of the TPV, where desirable ranges may include ranges from any lower limit to any upper limit.

Alternatively, the quantity of oil used can be defined on the basis of the amount of oil introduced to the vulcanization process before the curative is introduced ("pre-cure oil"), oil introduced with the curative, and the amount of oil introduced to the vulcanization process after the curative is introduce ("post-cure oil"). The pre-cure oil may be oil that comes from oil-extended oil and/or process-oil that is directly introduced to the vulcanization process before the curative is added. For example, the amount of pre-cure oil may range from a low of about 55 wt %, or 56 wt %, or 57 wt %, or 58 wt %, or 59 wt %, or 60 wt % to a high of about 65 wt %, or 66 wt %, or 67 wt %, or 68 wt %, or 69 wt %, or 70 wt %, based on the total amount of oil in the TPV, where desirable ranges may include ranges from any lower limit to any upper limit. For example, the amount of post-cure oil may range from a low of about 25 wt %, 26 wt %, 27 wt %, 28 wt %, 29 wt %, 30 wt %, or 31 wt %, to a high of about 40 wt %, or 41 wt %, or 42 wt %, or 43 wt %, or 44 wt %, or 45 wt %, or 46 wt %, based on the total amount of oil in the TPV, where desirable ranges may include ranges from any lower limit to any upper limit. For example, the amount of oil introduced with the curative may range from a low of 1 wt %, or 2 wt %, or 3 wt %, or 4 wt %, to a high of about 7 wt %, or 8 wt %, or 9 wt %, or 10 wt %, based on the total amount of oil in the TPV, where desirable ranges may include ranges from any lower limit to any upper limit.

Vulcanizing Agent

Any vulcanizing agent that is capable of curing or cross-linking the rubber employed in preparing the TPV may be used. For example, where the rubber includes an olefinic elastomeric copolymer, the cure agent may include peroxides, phenolic resins, free radical curatives, or other curatives conventionally employed.

In preferred embodiments, the TPV is cured using a phenolic resin vulcanizing to agent. Phenolic resin curatives can also be referred to as resole resins, which are made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms are preferred in some embodiments. In some embodiments, a blend of octyl phenol and nonylphenol-formaldehyde resins are employed. The blend may include from 25 wt % to 40 wt % octyl phenol and from 75 wt % to 60 wt % nonylphenol, more preferably, the blend includes from 30 wt % to 35 wt % octyl phenol and from 70 wt % to 65 wt % nonylphenol. In some embodiments, the blend includes about 33 wt % octylphenol-formaldehyde and about 67 wt % nonylphenol formaldehyde resin, where each of the octylphenol and nonylphenol include methylol groups. This blend can be solubilized in paraffinic oil at about 30% solids.

Useful phenolic resins may be obtained under the tradenames SP-1044, SP-1045 (Schenectady International; Schenectady, N.Y.), which may be referred to as alkylphenol-formaldehyde resins (also available in a 30/70 weight percent paraffinic oil solution under the trade name HRJ-14247A). SP-1045 is believed to be an octylphenol-formaldehyde resin that contains methylol groups. The SP-1044 and SP-1045 resins are believed to be essentially free of halogen substituents or residual halogen compounds. By "essentially free of halogen substituents," it is meant that the synthesis of the resin provides for a non-halogenated resin that may only contain trace amounts of halogen containing compounds.

Preferred phenolic resin may have a structure according to the following general formula:

where Q is a divalent radical selected from the group consisting of —CH2- and CH2-O—CH 2-; m is zero or a positive integer from 1 to 20 and R' is an alkyl group. Preferably, Q is the divalent radical —CH2-O—CH2-, m is zero or a positive integer from 1 to 10, and R' is an alkyl group having less than 20 carbon atoms. Still more preferably, m is zero or a positive integer from 1 to 5 and R' is an alkyl group having between 4 and 12 carbon atoms.

Other examples of suitable phenolic resins include those described in U.S. Pat. No. 8,207,279 and U.S. Patent Application No. 2013/0046049 A1.

In one or more embodiments, the phenolic resin may be employed in an amount to from about 2 to about 6 parts by weight, in other embodiments from about 3 to about 5 parts by weight, and in other embodiments from about 4 to about 5 parts by weight per 100 parts by weight of rubber.

Cure Accelerator

The curative is used in conjunction with a cure accelerator as described herein. The cure accelerator may be used to increase the degree of vulcanization of the TPV. Useful cure accelerators include metal halides, such as stannous chloride, stannous chloride anhydride, stannous chloride dehydrate, and ferric chloride. In preferred embodiments, the cure accelerator comprises stannous chloride. The cure accelerator is introduced into the vulcanization process as part of a masterbatch as described herein.

The stannous chloride can be used in its hydrous ($SnC_2 \cdot 2H_2O$) or anhydrous ($SnCl_2$) form. The stannous chloride can be used in a powdered, granulated, or flake form.

In some embodiments the cure accelerator is added in an amount of less than 1 wt % based on the total weight of the TPV. In some embodiments, stannous chloride may be used in an amount of from about 0.5 to about 2.0 phr, or from about 1.0 to about 1.5 phr, or from about 1.2 to about 1.3 parts by weight per 100 parts by weight of rubber.

Metal Oxide

In some embodiments, metal oxides may be added to the vulcanization process. It is believed that the metal oxide can act as a scorch retarder in the vulcanization process. Useful metal oxides include zinc oxides having a mean particle diameter of about 0.05 to about 0.15 μm. Useful zinc oxide can be obtained commercially under the tradename Kadox™ 911 (Horsehead Corp.).

In some embodiments, from about 0.1 to about 6.0 phr, or from about 1.0 to about 5.0 phr, or from about 2.0 to about 4.0 phr of zinc oxide may be employed.

Acid Scavenger

In some embodiments, the curative, such as a phenolic resin, is used in conjunction with an acid scavenger. The acid scavenger may be added downstream of the curative after the desired level of cure has been achieved. Useful acid scavengers include hydrotalcites. Both synthetic and natural hydrotalcites can be used. Exemplary natural to hydrotalcite can be represented by the formula $Mg_6Al_2(OH)_{1\text{-}6}CO_3 \cdot 4H_2O$. Synthetic hydrotalcite compounds, which are believed to have the formula: $Mg_{4.3}Al_2(OH)_{12.6}CO_3 mH_2O$ or $Mg_{4.5}Al_2(OH)_{13}CO_{3.3} \cdot 5H_2O$, can be obtained under the tradenames DHT-4A™ or Kyowaad™ 1000 (Kyowa, Japan). Another commercial example is that available under the trade name Alcamizer™ (Kyowa).

Additives

The TPV may further comprise one or more additives. These additives may be present in addition to, or in place of the additives which may be present in the rubber and thermoplastic resin components used to make the TPV. Suitable additives include, but are not limited to, plasticizers, fillers, and processing aids.

For example, the TPV composition may include reinforcing and non-reinforcing fillers, antioxidants, stabilizers, anti-blocking agents, anti-static agents, waxes, foaming agents, pigments, flame retardants and other processing aids known in the rubber compounding art. Fillers and extenders that can be utilized include conventional inorganics such as calcium carbonate, clays, silica, talc, titanium dioxide, carbon black, as well as organic and inorganic nanoscopic fillers. Fillers, such as carbon black, may be added as part of a masterbatch, and for example may be added in combination with a carrier such as polypropylene.

In one or more embodiments, the TPV includes at least about 5 wt %, 6 wt %, 7 wt %, 8 wt %, 9 wt %, or 10 wt % or of one or more fillers, such as calcium carbonate, clays, silica, talc, titanium dioxide, carbon black, and blends thereof, based on the weight of the TPV. In preferred embodiments, the TPV includes clay and/or carbon black in an amount ranging from a low of about 5 wt %, 6 wt %, 7 wt %, 8 wt %, 9 wt %, or 10 wt % to a high of about 15 wt %, 16 wt %, 17 wt %, 18 wt %, 19 wt %, or 20 wt %, based on the total weight of the TPV.

In one or more embodiments, the TPV comprises antioxidants in an amount less than or equal to 5 wt %, or 4 wt %, or 3 wt %, or 2 wt %, or 1 wt %, or 0.5 wt %, based on the total weight of the TPV, where desirable ranges may include ranges from any lower limit to any upper limit.

Propylene-Based Elastomer

The masterbatches described herein comprise one or more propylene-based polymers, such as propylene-based elastomers ("PBEs"). The PBE comprises propylene and from about 5 to about 30 wt % of one or more comonomers selected from ethylene and/or $C_4$-$C_{12}$ α-olefins. For example, the comonomer units may be derived from ethylene, butene, to pentene, hexene, 4-methyl-1-pentene, octene, or decene. In preferred embodiments, the comonomer is ethylene. In some embodiments, the PBE consists essentially of propylene and ethylene, or consists only of propylene and ethylene. Some of the embodiments described below are discussed with reference to ethylene as the comonomer, but the embodiments are equally applicable to PBEs with other α-olefin comonomers. In this regard, the copolymers may simply be referred to as PBEs with reference to ethylene as the α-olefin.

The PBE may include at least about 5 wt %, at least about 6 wt %, at least about 7 wt %, at least about 8 wt %, at least about 9 wt %, or at least about 10 wt %, α-olefin-derived units, based upon the total weight of the PBE. The PBE may include up to about 30 wt %, or up to about 25 wt %, up to about 22 wt %, up to about 20 wt %, up to about 17 wt %, up to about 15 wt %, up to about 13 wt %, or up to about 12 wt %, α-olefin-derived units, based upon the total weight of the PBE. In some embodiments, the PBE may comprise from about 5 to about 25 wt %, from about 6 to about 22 wt %, from about 7 wt % to about 20 wt %, from about 8 to about 17 wt %, from about 9 wt % to about 15 wt %, from about 9 wt % to about 13 wt %, or from about 10 to about 12 wt %, α-olefin-derived units, based upon the total weight of the PBE.

The PBE may include at least about 70 wt %, or at least about 75 wt %, at least about 78 wt %, at least about 80 wt %, at least about 83 wt %, at least about 85 wt %, at least 87 wt %, or at least 88 wt %, propylene-derived units, based upon the total weight of the PBE. The PBE may include up to about 95 wt %, up to about 94 wt %, up to about 93 wt %, up to about 92 wt %, up to about 91 wt %, or up to about 90 wt %, propylene-derived units, based upon the total weight of the PBE.

The PBE can be characterized by a melting point (Tm), which can be determined by differential scanning calorimetry (DSC). Using the DSC test method described herein, the melting point is the temperature recorded corresponding to the greatest heat absorption within the range of melting temperature of the sample. When a single melting peak is observed, that peak is deemed to be the "melting point." When multiple peaks are observed (e.g., principal and secondary peaks), then the melting point is deemed to be the highest of those peaks. It is noted that at the low-crystallinity end at which elastomers are commonly found, the melting point peak may be at a low temperature and be relatively flat, making it difficult to determine the precise peak location. A "peak" in this context is thus defined as a change in the general slope of the DSC curve (heat flow versus temperature) from positive to negative, forming a maximum without a shift in the baseline where the DSC curve is plotted so that an endothermic reaction would be shown with a positive peak.

The Tm of the PBE (as determined by DSC) may be less than about 110° C., less than about 100° C., less than about 90° C., less than about 80° C., less than about 70° C., less than about 65° C., less than about 60° C. The PBE may have a Tm of from about 20 to about 90° C., from about 30 to about 80° C., from about 40 to about 70° C., or from about 50 to about 65° C., where desirable ranges may include ranges from any lower limit to any upper limit. In some embodiments, the PBE may have a Tm of from about 55 to about 70° C., or from about 57 to about 68° C., or from about 60 to about 65° C., where desirable ranges may include ranges from any lower limit to any upper limit. In some embodiments, the PBE may have a Tm of from about 45 to about 65° C., or from about 50 to about 60° C., or from about 52 to about 58° C., where desirable ranges may include ranges from any lower limit to any upper limit.

The PBE can be characterized by its heat of fusion (Hf), as determined by DSC. The PBE may have an Hf that is at least about 1.0 J/g, at least about 3.0 J/g, at least about 5.0 J/g, at least about 7.0 J/g, at least about 10.0 J/g, at least about 12 J/g, at least about 15 J/g, at least about 20 J/g, or at least about 25 J/g. The PBE may be characterized by an Hf of less than about 60 J/g, less than about 50 J/g, less than about 40 J/g, less than about 35 J/g, less than about 30 J/g, less than about 25 J/g, less than about 20 J/g, less than about 15 J/g. The PBE may have a Hf of from about 1.0 to about 50 J/g, or from about 3.0 to about 40 J/g, or from about 5.0 to about 35 J/g, or from about 10.0 to about 30 J/g, where desirable ranges may include ranges from any lower limit to any upper limit. In some embodiments, the PBE may have a Hf of from about 1.0 to about 25 J/g, from about 5.0 to about 20 J/g, from about 10 to 20 J/g, or from about 12 to about 18 J/g, where desirable ranges may include ranges from any lower limit to any upper limit. In some embodiments, the PBE may have a Hf of from 5.0 to about 40 J/g, from about 10.0 to about 35 J/g, from about 15 to about 35 J/g, or from about 20 to about 30 J/g, or from about 25 to about 30 J/g, where desirable ranges may include ranges from any lower limit to any upper limit.

As used herein, DSC procedures for determining Tm and Hf are as follows. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a DSC (Perkin Elmer Pyris One Thermal Analysis System) and cooled to about −30° C. to about −50° C. and held for 10 minutes at that temperature. The sample is then heated at 10° C./min to attain a final temperature of about 200° C. The sample is kept at 200° C. for 5 minutes. Then a second cool-heat cycle is performed, where the sample is again cooled to to about −30° C. to about −50° C. and held for 10 minutes at that temperature, and then re-heated at 10° C./min to a final temperature of about 200° C. Events from both cycles are recorded. The thermal output is recorded as the area under the melting peak of the sample, which typically occurs between about 0° C. and about 200° C. It is measured in Joules and is a measure of the Hf of the polymer.

Preferably, the PBE has crystalline regions interrupted by non-crystalline regions. The non-crystalline regions can result from regions of non-crystallizable propylene segments, the inclusion of comonomer units, or both. In one or more embodiments, the PBE has a propylene-derived crystallinity that is isotactic, syndiotactic, or a combination thereof. In a preferred embodiment, the PBE has isotactic sequences. The presence of isotactic sequences can be determined by NMR measurements showing two or more propylene derived units arranged isotactically. Such isotactic sequences can, in some cases be interrupted by propylene units that are not isotactically arranged or by other monomers that otherwise disturb the crystallinity derived from the isotactic sequences.

The PBE can have a triad tacticity of three propylene units (mmm tacticity), as measured by 13C NMR, of 75% or greater, 80% or greater, 85% or greater, 90% or greater, 92% or greater, 95% or greater, or 97% or greater. In one or more embodiments, the triad tacticity may range from about 75 to about 99%, from about 80 to about 99%, from about 85 to about 99%, from about 90 to about 99%, from about 90 to about 97%, or from about 80 to about 97%, where desirable ranges may include ranges from any lower limit to any upper limit. Triad tacticity may be determined by the methods described in U.S. Pat. No. 7,232,871.

The PBE may have a tacticity index m/r ranging from a lower limit of 4 or 6 to an upper limit of 8 or 10 or 12, where desirable ranges may include ranges from any lower limit to any upper limit. The tacticity index, expressed herein as "m/r", is determined by $^{13}C$ nuclear magnetic resonance ("NMR"). The tacticity index, m/r, may be calculated as defined by H. N. Cheng in Vol. 17, Macromolecules, pp. 1950-1955 (1984), incorporated herein by reference. The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 describes an atactic material. An isotactic material theoretically may have a ratio approaching infinity, and many by-product atactic polymers have sufficient isotactic content to result in ratios of greater than 50.

The PBE may have a percent crystallinity determined according to DSC procedures of from about 0.5% to about 40%, from about 1% to about 30%, or from about to 5% to about 25%, where desirable ranges may include ranges from any lower limit to any upper limit. Crystallinity may be determined by dividing the Hf of a sample by the Hf of a 100% crystalline polymer, which is assumed to be 189 J/g for isotactic polypropylene.

The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm-1 to 4000 cm-1 is recorded and the monomer weight percent of ethylene can be calculated according to the following equation: Ethylene wt %=82.585−111.987X+30.045X2, where X is the ratio of the peak height at 1155 cm-1 and peak height at either 722 cm-1 or 732 cm-1, whichever is higher. For propylene ethylene copolymers having 75 wt % or less propylene content, the comonomer (ethylene) content can be measured using the procedure described in Wheeler and Willis. Reference is made to U.S. Pat. No. 6,525,157 which contains more details on GPC measurements, the determination of ethylene content by NMR and the DSC measurements.

The PBE has a density of from about 0.84 g/cm$^3$ to about 0.92 g/cm$^3$, from about 0.85 g/cm$^3$ to about 0.90 g/cm$^3$, or from about 0.86 g/cm$^3$ to about 0.88 g/cm$^3$ at room temperature, as measured per the ASTM D-1505 test method, where desirable ranges may include ranges from any lower limit to any upper limit.

The PBE can have a melt index (MI) (ASTM D-1238, 2.16 kg @ 190° C.), of less than or equal to about 25 g/10 min, less than or equal to about 10 g/10 min, less than or equal to about 8.0 g/10 min, less than or equal to about 5.0 g/10 min, or less than or equal to about 2.0 g/10 min. In some embodiments, the PBE has a MI of from about 0.5 to about 3.0 g/10 min or form about 0.75 to about 2.0 g/10 min, where desirable ranges may include ranges from any lower limit to any upper limit. In some embodiments, the PBE has a MI of from about 1.0 to about 25 g/10 min, or from about 1.0 to about 10 g/10 min, or from about 2.0 to about 6.0 g/10 min, or from about 2.5 to about 5.0 g/10 min, or from about 2.5 to about 25 g/10 min, or from about 2.5 to about 10 g/10 min, where desirable ranges may include ranges to from any lower limit to any upper limit.

The PBE may have a melt flow rate (MFR), as measured according to ASTM D-1238 (2.16 kg weight @ 230° C.), greater than about 0.5 g/10 min, greater than about 1.0 g/10 min, greater than about 1.5 g/10 min, greater than about 2.0 g/10 min, or greater than about 2.5 g/10 min. The PBE may have an MFR less than about 25 g/10 min, less than about 15 g/10 min, less than about 10 g/10 min, less than about 7 g/10 min, or less than about 5 g/10 min. The PBE may have an MFR from about 0.5 to about 15 g/10 min, from about 1.0 to about 10 g/10 min, or from about 1.5 to about 9 g/10 min, where desirable ranges may include ranges from any lower limit to any upper limit. In some embodiments, the PBE may have a MFR of from about 2.5 to about 25 g/10 min, or from about 2.5 to about 15 g/10 min, or from about 2.5 to about 12 g/10 min, or form about 5.0 to about 10 g/10 min, where desirable ranges may include ranges from any lower limit to any upper limit. In some embodiments, the PBE may have a MFR of from about 0.5 to about 7.0 g/10 min, or from about 1.0 to about 6.0 g/10 min, or from about 2.0 to about 5.0 g/10 min, where desirable ranges may include ranges from any lower limit to any upper limit.

The PBE may have a g' index value of 0.95 or greater, or at least 0.97, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l}$$

where ηb is the intrinsic viscosity of the polymer and ηl is the intrinsic viscosity of a linear polymer of the same viscosity-averaged molecular weight (Mv) as the polymer. ηl=KMvα, K and α are measured values for linear polymers and should be obtained on the same instrument as the one used for the g' index measurement.

The PBE may have a weight average molecular weight (Mw), as measured by MALLS, of from about 50,000 to about 1,000,000 g/mol, or from about 75,000 to about 500,000 g/mol, from about 100,000 to about 350,000 g/mol, from about 125,000 to about 300,000 g/mol, from about 175,000 to about 275,000 g/mol, where desirable ranges may include ranges from any lower limit to any upper limit. In some embodiments, the PBE may have a Mw of from about 175,000 to about 220,000 g/mol, or from about 180,000 to about 210,000 g/mol, where desirable ranges may include ranges from any lower limit to any upper limit. In some embodiments, the PBE may have a Mw of from about 240,000 to about 300,000 g/mol, or from about 250,000 to about 280,000 g/mol, or from about 260,000 to about 270,000 g/mol, where desirable ranges may include ranges from any lower limit to any upper limit.

The PBE may have a number average molecular weight (Mn), as measured by DRI, of from about 5,000 to about 500,000 g/mol, from about 10,000 to about 300,000 g/mol, from about 50,000 to about 250,000 g/mol, from about 75,000 to about 200,000 g/mol, or from about 90,000 to about 150,000 g/mol, where desirable ranges may include ranges from any lower limit to any upper limit. In some embodiments, the PBE may have a Mn of from about 80,000 to about 110,000 g/mol, from about 85,000 to about 105,000 g/mol, or from about 90,000 to about 100,000 g/mol, where desirable ranges may include ranges from any lower limit to any upper limit. In some embodiments, the PBE may have a Mn of from about 110,000 to about 140,000 g/mol, from about 115,000 to about 135,000 g/mol, or from about 120,000 to about 130,000 g/mol, where desirable ranges may include ranges from any lower limit to any upper limit.

The PBE may have a z-average molecular weight (Mz), as measured by MALLS, of from about 50,000 to about 1,000,000 g/mol, from about 75,000 to about 500,000 g/mol, from about 100,000 to about 475,000 g/mol, from about 200,000 to about 400,000 g/mol, or from about 250,000 to about 400,000 g/mol, where desirable ranges may include ranges from any lower limit to any upper limit. In some embodiments, the PBE may have a Mz of from about 270,000 to about 310,000 g/mol, from about 275,000 to about 300,000 g/mol, or from about 280,000 to about 295,000 g/mol, where desirable ranges may include ranges from any lower limit to any upper limit. In some embodiments, the PBE may have a Mz of from about 370,000 to about 420,000 g/mol, from about 380,000 to about 410,000 g/mol, or from about 385,000 to about 400,000 g/mol, where desirable ranges may include ranges from any lower limit to any upper limit.

The molecular weight distribution (MWD, equal to Mw/Mn) of the PBE may be from about 0.5 to about 20, from about 0.75 to about 10, from about 1.0 to about 5, from about 1.5 to about 4, or from about 1.8 to about 3, where desirable ranges may include ranges from any lower limit to any upper limit.

The PBE may have a Shore D hardness of less than about less than about 50, or less than about 45, or less than about 40, or less than about 35. The PBE may have a Shore D hardness of from about 10 to about 50, or from about 15 to about 45, or from about 20 to about 40, or from about 25 to about 35, where desirable ranges may include ranges from any lower limit to any upper limit.

The PBE may have a Mooney viscosity (ML (1+4) @125.degree. C.) of from a low of about 5, 7, or 10 to a high of about 30, 35, or 40. In some embodiments, the PBE has a Mooney viscosity of from about 5 to about 20, or from about 7 to about 18, or form about 10 to about 15, where desirable ranges may include ranges from any lower limit to any upper limit. In some embodiments, the PBE has a Mooney viscosity of from about 10 to about 40, or from about 15 to about 37, or from about 20 to about 35, or from about 25 to about 30, where desirable ranges may include ranges from any lower limit to any upper limit.

The PBE may have a Vicat softening temperature of less than 100° C., or less than 90° C., or less than 80° C., or less than 75° C., or less than 70° C. The PBE may have a Vicat softening temperature of at least 30° C., or at least 40° C., or at least 50° C. or at least 60° C.

In some embodiments, the TPV contains a PBE that is a propylene-ethylene copolymer that has from about 9 wt % to about 15 wt % or from about 10 to about 12 wt %, ethylene-derived units and has at least three, or at least four, or at least five, or at least six, or at least seven, or all eight of the following properties (i) a Tm of from about 55 to about 70° C., or from about 57 to about 68° C., or from about 60 to about 65° C.; (ii) a Hf of from 5.0 to about 40 J/g, from about 10.0 to about 35 J/g, from about 15 to about 35 J/g, or from about 20 to about 30 J/g, or from about 25 to about 30 J/g; (iii) a MI of from about 1.0 to about 8.0 g/10 min, or from about 2.0 to about 6.0 g/10 min, or from about 2.5 to about 5.0 g/10 min; (iv) a MFR of from about 2.5 to about 12 g/10 min, or form about 5.0 to about 10 g/10 min; (v) a Mw of from about 175,000 to about 220,000 g/mol, or from about 180,000 to about 210,000 g/mol; (vi) a Mn of from about 80,000 to about 110,000 g/mol, from about 85,000 to about 105,000 g/mol, or from about 90,000 to about 100,000 g/mol; (vii) a Mz of from about 270,000 to about 310,000 g/mol, from about 275,000 to about 300,000 g/mol, or from about 280,000 to about 295,000 g/mol; and/or (viii) a Mooney viscosity of from about 5 to about 20, or from about 7 to about 18, or form about 10 to about 15.

In some embodiments, the TPV contains a PBE that is a propylene-ethylene copolymer that has from about 9 wt % to about 15 wt % or from about 10 to about 12 wt %, ethylene-derived units and has at least three, or at least four, or at least five, or at least six, or at least seven, or all eight of the following properties (i) a Tm of from about 45 to about 65° C., or from about 50 to about 60° C., or from about 52 to about 58° C.; (ii) a Hf of from about 1.0 to about 25 J/g, from about 5.0 to about 20 J/g, from about 10 to 20 J/g, or from about 12 to about 18 J/g; (iii) a MI of from about 0.5 to about 3.0 g/10 min or form about 0.75 to about 2.0 g/10 min; (iv) a MFR of from about 0.5 to about 7.0 g/10 min, or from about 1.0 to about 6.0 g/10 min, or from about 2.0 to about 5.0 g/10 min; (v) a Mw of from about 240,000 to about 300,000 g/mol, or from about 250,000 to about 280,000 g/mol, or from about 260,000 to about 270,000 g/mol; (vi) a Mn of from about 110,000 to about 140,000 g/mol, from about 115,000 to about 135,000 g/mol, or from about 120,000 to about 130,000 g/mol; (vii) a Mz of from about 370,000 to about 420,000 g/mol, from about 380,000 to about 410,000 g/mol, or from about 385,000 to about 400,000 g/mol; and/or (viii) a Mooney viscosity of from about 10 to about 40, or from about 15 to about 37, or from about 20 to about 35, or from about 25 to about 30.

Optionally, the PBE may also include one or more dienes. The term "diene" is defined as a hydrocarbon compound that has two unsaturation sites, i.e., a compound having two double bonds connecting carbon atoms. Depending on the context, the term "diene" as used herein refers broadly to either a diene monomer prior to polymerization, e.g., forming part of the polymerization medium, or a diene monomer after polymerization has begun (also referred to as a diene monomer unit or a diene-derived unit). In some embodiments, the diene may be selected from 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD), and combinations thereof. In embodiments where the PBE comprises a diene, the diene may be present at from 0.05 wt % to about 6 wt %, from about 0.1 wt % to about 5.0 wt %, from about 0.25 wt % to about 3.0 wt %, from about 0.5 wt % to about 1.5 wt %, diene-derived units, based upon the total weight of the PBE.

The PBE are preferably prepared using homogeneous conditions, such as a continuous solution polymerization process. Exemplary methods for the preparation of propylene-based polymer may be found in U.S. Pat. Nos. 6,881,800; 7,803,876; 8,013,069; and 8,026,323 and PCT Publications WO 2011/087729; WO 2011/087730; and WO 2011/087731.

Masterbatch

As described herein, the TPV is formed utilizing a masterbatch that comprises a propylene-based elastomer and the cure accelerator. In preferred embodiments, the masterbatch comprises, or consists essentially of, propylene-based elastomer and stannous chloride.

The masterbatch may be provided to the vulcanization process as pellets, preferably, free-flowing pellets. The pellets may be characterized by an average diameter of from about 0.25 mm to about 10 mm, or from about 0.5 mm to about 5 mm, or from about 1 mm to about 4 mm.

The masterbatch may comprise at least 20 wt %, at least 25 wt %, at least 30 wt %, at least 35 wt %, or at least 40 wt %, at least 45 wt %, at least 50 wt %, at least 55 wt %, at least 60 wt %, or at least 70 wt % of cure accelerator, based on the weight of the masterbatch. The masterbatch may comprise less than 90 wt %, less than 85 wt %, less than 80 wt %, less than 75 wt %, less than 70 wt %, less than 65 wt %, less than 60 wt %, less than 55 wt %, of the cure accelerator, based on the weight of the masterbatch. In some embodiments, the masterbatch may comprise from about 25 to about 75 wt %, from about 30 to about 70 wt %, from about 35 to about 65 wt %, or about 40 to about 60 wt % cure accelerator, based on the total weight of the masterbatch. In some embodiments, the masterbatch may comprise from about 45 to about 90 wt %, or from about 50 to about 80 wt %, cure accelerator, based on the total weight of the masterbatch.

In some embodiments, the masterbatch may contain other additives in addition to the cure accelerator and the propylene-based elastomer. For example, the masterbatch may further comprise inert fillers such as a clay, silica, or carbon black. In some embodiments, the masterbatch includes less than about 25 wt %, or less than about 15 wt %, or less than about 10 wt %, or less than about 5 wt %, or less than about 1 wt % of material other than the cure accelerator and the propylene-based elastomer, based on the weight of the masterbatch. In some embodiments, the masterbatch consists essentially of, or consists of, only propylene-based elastomer and the cure accelerator.

Dynamic Vulcanization Process

As those skilled in the art appreciate, dynamic vulcanization includes a process whereby a rubber that is undergoing mixing with a thermoplastic resin is cured. The rubber is crosslinked or vulcanized under conditions of high shear at a temperature above the melting point of the thermoplastic resin. As a result of the process, the thermoplastic resin becomes the continuous phase of the mixture and the rubber becomes dispersed as a discontinuous phase within the continuous thermoplastic phase. Thus, in some embodiments, the mixture undergoes a phase inversion during dynamic vulcanization, where the blend, which initially includes a major volume fraction of rubber, is converted to a blend where the plastic phase is the continuous phase and the rubber is simultaneously crosslinked and dispersed as fine particles within the thermoplastic matrix.

In general, the dynamic vulcanization takes place within a reactor, as will be described in greater detail below. The rubber and the thermoplastic resin are typically introduced to the reactor as solids. The rubber and thermoplastic resin are then mixed at a temperature above the melt temperature of the thermoplastic resin. Following this initial to blending, the curative is introduced to the blend and curing of the rubber begins.

As described herein, a cure accelerator, such as stannous chloride, is introduced to the reactor as a masterbatch with a propylene-based elastomer. In one or more embodiments, the masterbatch is in the form of solid particles or pellets. In some embodiments, these solid particles or pellets are introduced to the reactor together with the rubber and thermoplastic resin. The masterbatch may then undergo mixing with the rubber and thermoplastic resin at elevated temperatures, which may include temperatures at or above the melt temperature of the thermoplastic resin.

The process of one or more embodiments can be described as follows. The process includes introducing a rubber with a thermoplastic resin to form a blend, which may be referred to as a solids blend, although not all components of the blend need to be in the solid state. Additionally, the masterbatch of the cure accelerator, such as stannous chloride, and the propylene-based elastomer are introduced to blend. Other solid ingredients can be introduced such as fillers, zinc oxide, and other miscellaneous solids such as pigments and antioxidants. These miscellaneous solids can be pre-blended with other solids, such as the rubber, prior to blending with the other ingredients, or they may be separately combined with the other solid ingredients to form the solids blend.

The blend is continually mixed at a temperature above the melt temperature of the thermoplastic resin to form a molten blend. The phenolic resin curative, which may be in the form of a solid or a liquid, is introduced to molten blend to form a vulcanizable blend. Heating and mixing continues in order to effect dynamic vulcanization.

An oil can be introduced at any stage, or in multiple stages, of the process. For example, oil can be added to the solids blend, to the molten blend, together with the curative, or after dynamic vulcanization.

Following dynamic vulcanization, mixing may continue and additional additives or ingredients can be incorporated into the molten product, which may be referred to as a molten thermoplastic vulcanizate. For example, post vulcanization additives, such as acid scavengers, can be added to the molten mass following dynamic vulcanization. The product, can then be extruded through an extruder die, or otherwise fabricated, and ultimately cooled for handling. Further manufacturing and processing of the thermoplastic vulcanizate may proceed in a conventional manner. For example, the molten thermoplastic vulcanizate composition may be cooled and/or solidified and subsequently pelletized for future storage and/or shipment. Practice of the present invention is not necessarily limited by the manner in which the thermoplastic vulcanizate composition is subsequently solidified or fabricated.

The process of dynamic vulcanization as described herein can take place in a continuous mixing reactor, which may also be referred to as a continuous mixer. Continuous mixing reactors may include those reactors that can be continuously fed ingredients and that can continuously have product removed therefrom. Examples of continuous mixing reactors include twin screw or multi-screw extruders (e.g., ring extruder). Methods and equipment for continuously preparing thermoplastic vulcanizates are described in U.S. Pat. Nos. 4,311,628; 4,594,390; 5,656,693; 6,147,160; and 6,042,260, as well as WO 2004/009327 A1, which are incorporated herein by reference, although methods employing low shear rates can also be used. The temperature of the blend as it passes through the various barrel sections or locations of a continuous reactor can be varied as is known in the art. In particular, the temperature within the cure zone may be controlled or manipulated according to the half-life of the curative employed.

Product Characteristics

The TPV compositions include a continuous thermoplastic phase with a cured rubber phase dispersed therein. In particular embodiments, the rubber phase is a discontinuous phase dispersed within the thermoplastic phase. The rubber is advantageously at least partially cured or fully cured.

Despite the fact that the elastomer may be fully cured, the TPVs produced by the present method can be processed and reprocessed by conventional plastic processing techniques such as extrusion, injection molding, blow molding, and compression molding. The elastomer within these thermoplastic elastomers can be in the form of finely-divided and well-dispersed particles of vulcanized or cured elastomer within a continuous thermoplastic phase or matrix. In other embodiments, a co-continuous morphology may exist. In those embodiments where the cured elastomer is in the form of finely-divided and well-dispersed particles within the thermoplastic medium, the elastomer particles can have an average diameter that is less than 50 µm, less than 30 µm, less than 10 µm, less than 5 µm, or less than 1 µm. In certain embodiments, at least 50%, at least 60%, or at least 75% of the particles have an average diameter of less than 5 µm, less than 2 µm, or less than 1 µm.

In the present invention, by utilizing a masterbatch comprising the cure accelerator and propylene-based elastomer, the cure accelerator can be encapsulated within the propylene-based elastomer and thereby can have less affinity to moisture in the air. This can reduce or eliminate unwanted compaction of the cure accelerator and blockage of the feeder. The masterbatch feed of the cure accelerator can also provide a more efficient method to for metering more precise amounts of the cure accelerator to the vulcanization process.

Further, it has been discovered that the use of the masterbatch can allow more even dispersion of the cure accelerator throughout the vulcanizable composition and thereby achieve a more consistent cross link or cure of the elastomer. Likewise, the masterbatch may advantageously shield the cure accelerator from participating in undesirable side reactions. As a result of the above described improvements, the need to feed excess cure accelerator to the process can be avoided, which is especially advantageous as related to large commercial processes where excess powdered stannous chloride was often needed to provide the needed level of cure.

Furthermore, it has been found that the use of a propylene-based elastomer as the carrier resin for the masterbatch can allow for higher loading levels of the cure accelerator in the masterbatch as compared to traditional polypropylene carrier resins. Thus, the use of the propylene-based elastomer can allow for the masterbatch to comprises at least 50 wt % of cure accelerator.

Additionally, it has been found that the use of a propylene-based elastomer as the carrier resin for the masterbatch can allow for a more efficient cure in soft thermoplastic vulcanizates. Thus, the use of the masterbatches described herein can be particularly beneficial for when producing TPVs having a Shore A hardness of less than 70, or less than 65. Shore hardness can be determined based on method ASTM D-2240. Without being bound by theory, it is believed that the propylene-based elastomer has better compatibility with the rubber phase of the vulcanizate and thus allows for a quicker and more efficient cure as compared to vulcanizates made using masterbatches that utilize a polypropylene resin.

End Use Applications

The thermoplastic vulcanizate compositions of the present invention have a variety of uses as is known in the art. Practice of the present invention does not necessarily limit the intended or expected uses of the thermoplastic vulcanizates. As is known in the art, thermoplastic elastomers of this invention are useful for making a variety of articles such as weather seals, hoses, belts, gaskets, moldings, boots, elastic fibers, and like articles. They are useful for making articles by blow molding, extrusion, injection molding, thermoforming, elasto-welding and compression molding techniques. More specifically, they are useful for making vehicle parts such as weather seals, brake parts such as cups, coupling disks, and diaphragm cups, boots for constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Materials Used in Examples

"PP5341" was ExxonMobil™ PP5341E1 polypropylene homopolymer which is commercially available from ExxonMobil Chemical Company. Typical properties of PP5341 include: a melt mass-flow rate (MFR) of 0.83 g/10 min (ASTM D1238; 230° C.; 2.16 kg); a density of 0.9 g/cc; and a deflection temperature under load at 66 psi (unannealed) of 183° F. (ASTM D648).

"V3666" was Vistalon™ 3666 ethylene propylene diene terpolymer rubber which is commercially available from ExxonMobil Chemical Company. V3666 has an ethylene content of 64.0 wt % (ASTM D3900) and an ethylidene norbornene content of 4.5 wt % (ASTM D6047). V3666 is an oil-extended rubber with an oil content of 75 phr and has a Mooney viscosity of 52 MU (ASTM D1646; ML 1+4, 125° C.).

"V7001" was Vistalon™ 7001 ethylene propylene diene terpolymer rubber which is commercially available from ExxonMobil Chemical Company. V70001 has an ethylene content of 73.0 wt % (ASTM D3900) and an ethylidene norbornene content of 5.0 wt % (ASTM D6047). V70001 is not an oil-extended rubber and has a Mooney viscosity of 60 MU (ASTM D1646; ML 1+4, 125° C.).

"V722" was Vistalon™ 722 ethylene propylene copolymer rubber which is commercially available from ExxonMobil Chemical Company. V722 has an ethylene content of 72.0 wt % (ASTM D3900) with the remainder being propylene. V722 has a melt index of 1.0 g/10 min (190° C.; 2.16 kg) and a Mooney viscosity of 17 MU (ASTM D1646; ML 1+4, 125° C.).

"VM3000" was Vistamaxx™ 3000 propylene-ethylene performance polymer which is available from ExxonMobil Chemical Company. VM3000 has an ethylene content of 11 wt % with the balance being propylene. Typical properties of VM3000 include: a density of 0.873 g/cc (ASTM D1505); a melt index of 3.6 g/10 min (ASTM D1238; 190° C., to 2.16 kg); a melt mass-flow rate of 8 g/10 min (230° C., 2.16 kg);

a Shore D hardness of 33 (ASTM D2240); and a Vicat softening temperature of 65.6° C.

"VM3020" was Vistamaxx™ 3020 propylene-ethylene performance polymer which is available from ExxonMobil Chemical Company. VM3020 has an ethylene content of 11 wt % with the balance being propylene. Typical properties of VM3020 include: a density of 0.874 g/cc (ASTM D1505); a melt index of 1.1 g/10 min (ASTM D1238; 190° C., 2.16 kg); a melt mass-flow rate of 3 g/10 min (230° C., 2.16 kg); a Shore D hardness of 34 (ASTM D2240); and a Vicat softening temperature of 68.3° C.

"VM6102" was Vistamaxx™ 6102 propylene-ethylene performance polymer, which is available from ExxonMobil Chemical Company. VM6102 has an ethylene content of 16 wt % with the balance being propylene. Typical properties of VM6102 include: a density of 0.862 g/cc (ASTM D1505); a melt index of 1.4 g/10 min (ASTM D1238; 190° C., 2.16 kg); a melt mass-flow rate of 3 g/10 min (230° C., 2.16 kg); a Shore A hardness of 66 (ASTM D2240); and a Vicat softening temperature of 52.2° C.

"VM6202" was Vistamaxx™ 6202 propylene-ethylene performance polymer, which is available from ExxonMobil Chemical Company. VM6202 has an ethylene content of 15 wt % with the balance being propylene. Typical properties of VM6202 include: a density of 0.863 g/cc (ASTM D1505); a melt index of 9.1 g/10 min (ASTM D1238; 190° C., 2.16 kg); a melt mass-flow rate of 20 g/10 min (230° C., 2.16 kg); a Shore A hardness of 66 (ASTM D2240); and a Vicat softening temperature of 47.2° C.

"VM6202FL" was Vistamaxx™ 6202FL propylene-ethylene performance polymer, which is available from ExxonMobil Chemical Company. VM6202FL has an ethylene content of 15 wt % with the balance being propylene. Typical properties of VM6202FL include: a density of 0.863 g/cc (ASTM D1505); a melt index of 9.1 g/10 min (ASTM D1238; 190° C., 2.16 kg); a melt mass-flow rate of 20 g/10 min (230° C., 2.16 kg); a Shore A hardness of 66 (ASTM D2240); and a Vicat softening temperature of 47.2° C.

"SP1045" was the phenolic resin-curative.

"ZnO" was zinc oxide.

"SnCl2" was stannous chloride dehydrate available from Alfa Aesar, a Johnson Matthey CompanyMason Corporation or William Blythe Limited.

Example 1

Polymeric masterbatches were formed by mixing the ingredients in Table 1 in a Banbury mixer (Table 1A shows the ingredients listed in parts per hundred parts of rubber to and Table 1B shows the ingredients listed by weight percent based on the total weight of the polymeric masterbatch). The polymeric masterbatches were formulated such that TPVs formed with the PM-100 formulation would have a target Shore A hardness of 60 and those formed with the PM-300 formulation would have a target Shore A hardness of 80. The Banbury mixer was operated at a temperature of 190° C. and 50 rpm. The EPDM and polypropylene was first introduced into the mixer and allowed to masticate for 4 minutes, the ZnO was then added and the mixture was masticated for an additional 3 minutes, the SP1045 was then added and the mixture was masticated for an additional 1 minute. To facilitate the introduction of the polymeric masterbatch into the process for forming the thermoplastic vulcanizates, tapes were formed from the polymeric masterbatches. To form the tape the polymeric masterbatch material from the Banbury mixer was introduced into a Haake single screw extruder to form samples of 50 mm×2 mm tape. The Haake settings were as follows: 200/200/2000/2000, 100 rpm, 50 mm tape die, 2 mm gage.

TABLE 1A

Polymeric Masterbatches in PHR

| Ingredient | PM-100 | PM-300 |
|---|---|---|
| V3666 | 175 | 175 |
| PP5341 | 50 | 90 |
| SP1045 | 8 | 8 |
| ZnO | 2 | 2 |
| Total PHR | 235 | 275 |

TABLE 1A

Polymeric Masterbatches in Weight Percent

| Ingredient | PM-100 | PM-300 |
|---|---|---|
| V3666 | 74.5 wt % | 63.6 wt % |
| PP5341 | 21.3 wt % | 32.7 wt % |
| SP1045 | 3.4 wt % | 2.9 wt % |
| ZnO | 0.9 wt % | 0.7 wt % |
| Total Weight % | 100 wt % | 100 wt % |

Curative masterbatches were prepared in a Brabender mixer using the formulations and mixing instructions listed in Table 2. The mixtures from the Brabender were dried overnight at 60° C. and then formed into a strand via a capillary rheometer. The capillary rheometer set points were as follows: CY394-40RC; 180° C.; 100 Hz.

TABLE 2

Curative Masterbatches

| Ingredient | CM-001 | CM-002 | CM-003 | CM-004 | CM-005 | CM-006 |
|---|---|---|---|---|---|---|
| PP5341 | 50 wt % | — | — | — | — | — |
| V3666 | — | 50 wt % | — | — | — | — |
| V7001 | — | — | 50 wt % | — | — | — |
| VM3000 | — | — | — | 50 wt % | — | — |
| VM3020 | — | — | — | — | 50 wt % | — |
| V722 | — | — | — | — | — | 50 wt % |
| SnCl2•2H2O | 50 wt % | 50 wt % | 50 wt % | 50 wt % | 50 wt % | 50 wt % |

Mixing Instructions

| Brabender Set Points | | | |
|---|---|---|---|
| Temp (° C.) | RPM | Mixing Time (s) | Instructions |
| 0 | 60° C. | — | — | Dry SnCl2*2H2O at 60° C. overnight in a vacuum oven. |
| 1 | S#100: 180° C. | — | — | Preheat instrument. |
| 2 | S#200-600: 140° C. | 30 | 120 | Introduce polymer and masticate. |
| 3 | | 60 | 30 | Masticate. |
| 4 | | 60 | 40 | Introduce SnCl2 and masticate. |
| 5 | | 0 | — | Press mixture into a relatively thin pad. Store in sealed plastic bag. |

65 gram samples of thermoplastic vulcanizates were formed using the formulations in Table 3. The polymeric masterbatches were charged to a Brabender with set to points of 190° C. and 30 rpm. The polymeric masterbatches were mixed until they came to equilibrium torque and temperature. Precut strands of the curative masterbatches were then fed to the Brabender at T=5 minutes of mixing. The torque was monitored and recorded. Samples were allowed to masticate for a total of 20 minutes (15 minutes after the curative masterbatches were added).

TABLE 3

Thermoplastic Vulcanizates

| | Polymer Masterbatch Used | Curative Masterbatch Used | Weight of Polymer Masterbatch | Weight of Curative Masterbatch |
|---|---|---|---|---|
| TPV-101 | PM-100 | CM-001 | 64.45 g | 0.55 g |
| TPV-102 | PM-100 | CM-002 | 64.45 g | 0.55 g |
| TPV-103 | PM-100 | CM-003 | 64.45 g | 0.55 g |
| TPV-104 | PM-100 | CM-004 | 64.45 g | 0.55 g |
| TPV-105 | PM-100 | CM-005 | 64.45 g | 0.55 g |
| TPV-106 | PM-100 | CM-006 | 64.45 g | 0.55 g |
| TPV-301 | PM-300 | CM-001 | 64.53 g | 0.47 g |
| TPV-302 | PM-300 | CM-002 | 64.53 g | 0.47 g |
| TPV-303 | PM-300 | CM-003 | 64.53 g | 0.47 g |
| TPV-304 | PM-300 | CM-004 | 64.53 g | 0.47 g |
| TPV-305 | PM-300 | CM-005 | 64.53 g | 0.47 g |
| TPV-306 | PM-300 | CM-006 | 64.53 g | 0.47 g |

Figure 1:
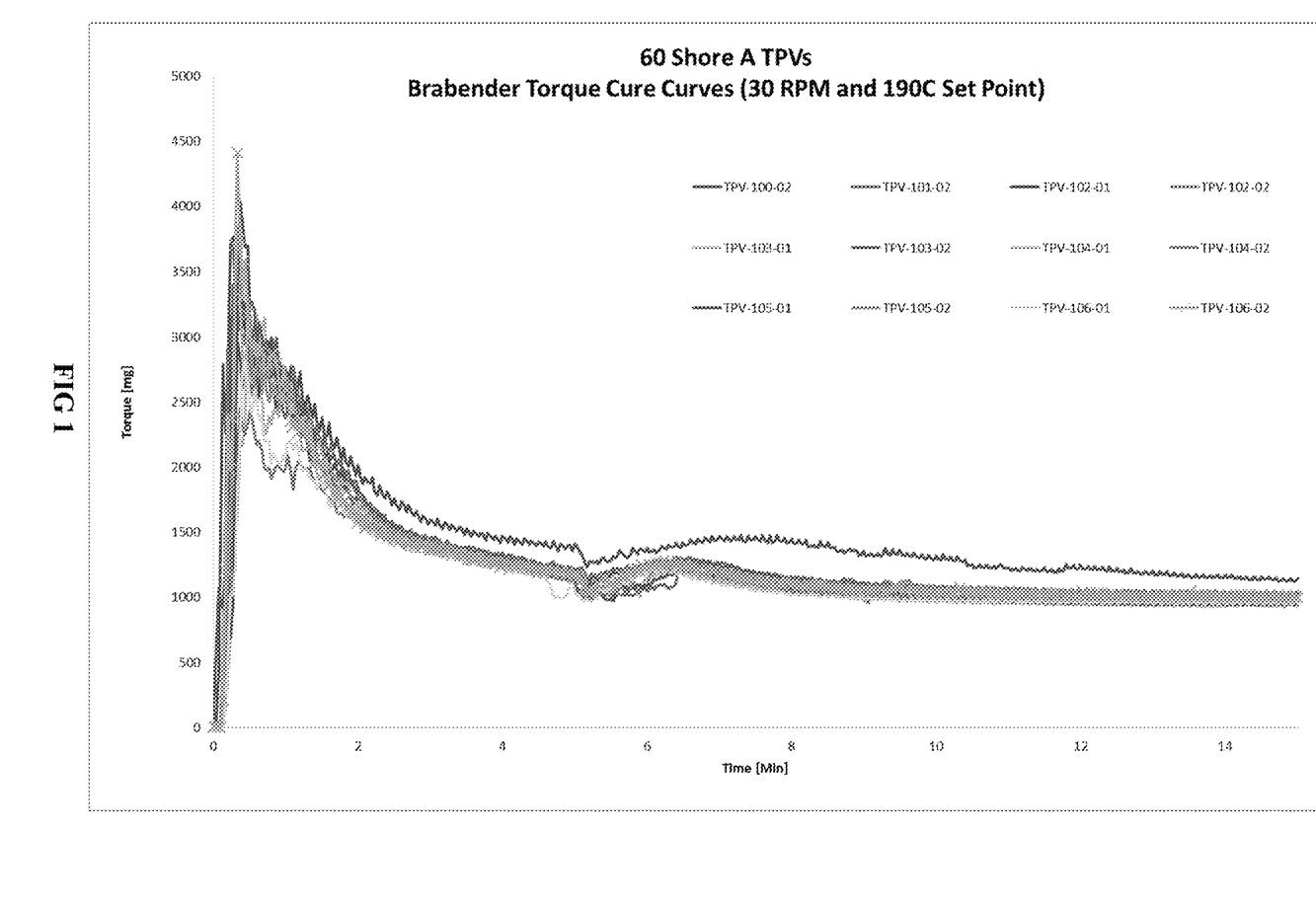
FIG. 1 illustrates the torque exhibited when making TPV samples 101 to 106 in Example 1.

FIG. 1 shows the torque measurements that were made during the formation of the TPV samples 101 to 106. As seen in FIG. 1, the torque curves exhibit a dip at the time when the curative masterbatch was introduced into the Brabender. The torque then increased to a peak after the introduction of the curative masterbatch strands after which time the torque began to decrease and level out. The time to the peak was measured, and as seen in FIG. 1 and Table 4, the time to the peak was longer for the TPVs made using the curative masterbatches that contained PP5341.

TABLE 4

Time to Peak Torque After Introduction of Curative Masterbatch

| TPV Sample | Time (minutes) |
|---|---|
| TPV-101 | 7.0 |
| TPV-102 | 6.3 |
| TPV-103 | 6.4 |
| TPV-104 | 6.4 |
| TPV-105 | 6.4 |
| TPV-106 | 6.2 |

Figure 2:
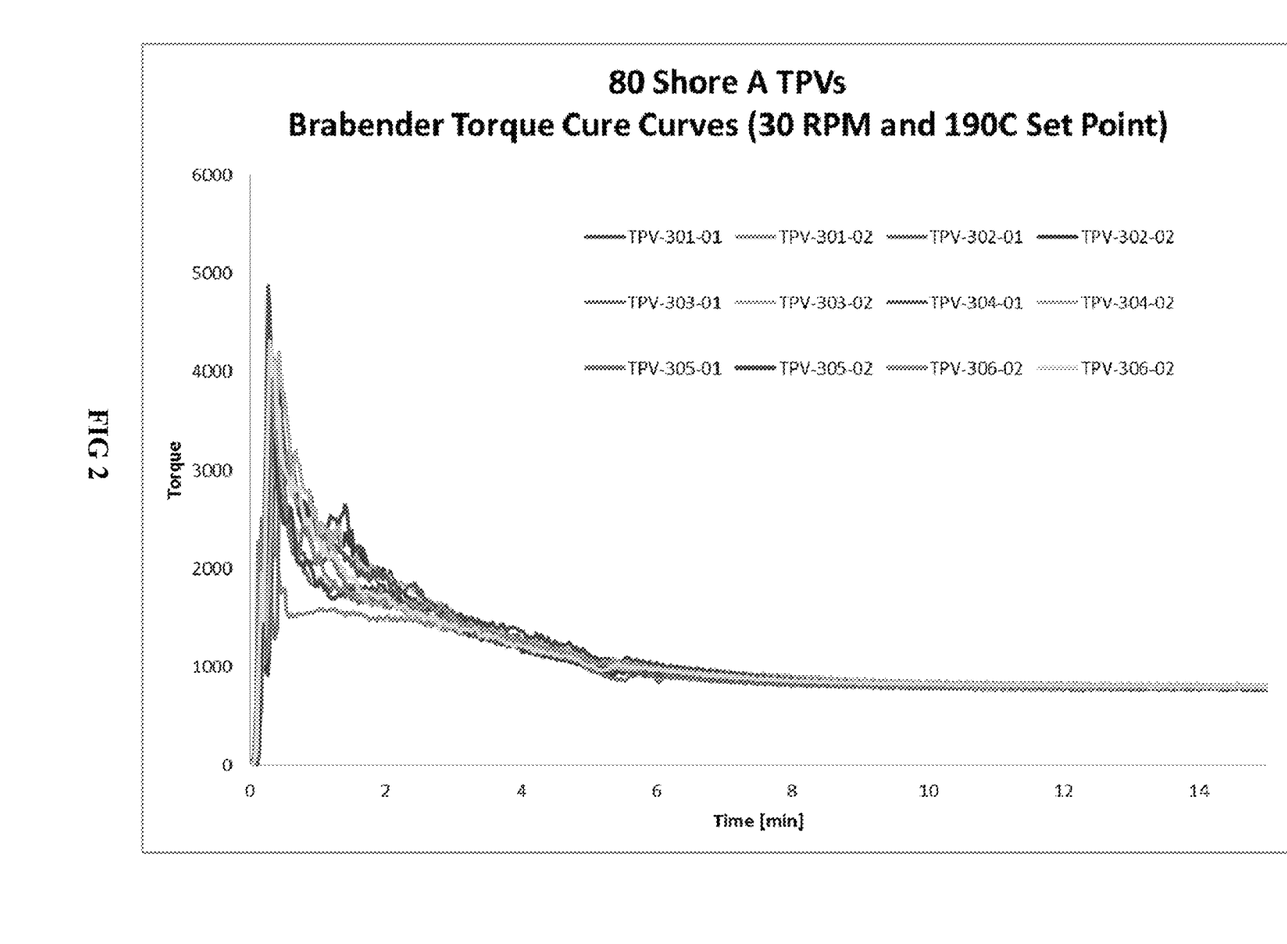
FIG. 2 illustrates the torque exhibited when making TPV samples 301 to 306 in Example 1.

FIG. 2 shows the torque measurements that were made during the formation of the TPV samples 301 to 306.

Rheological properties of the TPVs were measured with the results shown in Table 5.

The rheological properties of the TPVs were measured by small angle and large angle oscillatory shear measurements (SAOS and LAOS, respectively). The SAOS and LAOS measurements were completed on an Alpha Technologies ATD 1000 using serrated 25 mm parallel plates with a gap of 2.5 mm. The TPV samples were prepared for the test by placing the sample in a vacuum oven at a temperature between 60 and 70° C. for between 8 and 12 hours prior to analysis. 5 gram quantities of the material were then placed between two 0.001" polyester sheets (Alpha part # F0141) to prevent the samples from sticking to the parallel plate fixture. The material was allowed to melt for 30 seconds prior to closing the fixture. The first shear measurement was made after 4.5 minutes of clamping inside the fixture. Bulk Modulus components (G*, G' and G") and shear viscosity components (Eta*, eta' and eta") from each run were calculated by the machine software (Workbench v 5.70 published by Alpha Technologies). Tests were run in duplicate and the average reported.

TABLE 5A

TPV Rheological Properties

| | TPV-101 | TPV-102 | TPV-103 | TPV-104 | TPV-105 | TPV-106 |
|---|---|---|---|---|---|---|
| 215° C., 0.5 Rad/Sec | | | | | | |
| G" [kPa] | 17.25 | 15.27 | 17.16 | 16.64 | 15.32 | 15.98 |
| G' [kPa] | 95.41 | 101.18 | 103.30 | 101.30 | 105.14 | 91.12 |
| G* [kPa] | 96.95 | 102.33 | 104.71 | 102.67 | 106.26 | 92.515 |
| Eta" [Pa·s] | 193142 | 204834 | 209119 | 205072 | 212850 | 184471 |
| Eta' [Pa·s] | 34916 | 30906 | 34733 | 33686 | 310111 | 32336 |
| Eta* [Pa·s] | 196273 | 207161 | 211985 | 207845 | 215122 | 187288 |
| 215° C., 175 Rad/Sec | | | | | | |
| G" [kPa] | 35.35 | 35.82 | 35.49 | 37.07 | 36.34 | 37.00 |
| G' [kPa] | 208.22 | 213.98 | 213.43 | 217.84 | 222.16 | 211.82 |
| G* [kPa] | 211.20 | 216.96 | 216.35 | 220.97 | 225.12 | 215.03 |
| Eta" [Pa·s] | 1153 | 1185 | 1182 | 1207 | 1231 | 1173 |
| Eta' [Pa·s] | 196 | 199 | 197 | 206 | 202 | 205 |
| Eta* [Pa·s] | 1170 | 1202 | 1198 | 1224 | 1247 | 1191 |
| 90° C., 1% Strain | | | | | | |
| G" [kPa] | 250.81 | 241.47 | 246.76 | 245.63 | 249.91 | 255.94 |
| G' [kPa] | 3275.17 | 3254.62 | 3224.19 | 3251.09 | 3424.75 | 3320.65 |
| G* [kPa] | 3284.76 | 3263.57 | 3233.61 | 3260.37 | 3433.86 | 3330.50 |
| 90° C., 2% Strain | | | | | | |
| G" [kPa] | 257.16 | 261.94 | 271.72 | 265.38 | 263.86 | 274.93 |
| G' [kPa] | 3116.75 | 3109.64 | 3062.35 | 3094.35 | 3278.90 | 3174.43 |
| G* [kPa] | 3127.35 | 3120.66 | 3074.38 | 3105.72 | 3289.50 | 3186.32 |
| 90° C., 6% Strain | | | | | | |
| G" [kPa] | 362.87 | 360.80 | 382.47 | 369.12 | 288.67 | 288.13 |
| G' [kPa] | 2513.56 | 2498.97 | 2429.34 | 2461.04 | 2741.42 | 2651.51 |
| G* [kPa] | 2539.65 | 2524.88 | 2459.27 | 2488.59 | 2756.59 | 2667.13 |

TABLE 5B

| | TPV-301 | TPV-302 | TPV-303 | TPV-304 | TPV-305 | TPV-306 |
|---|---|---|---|---|---|---|
| TPV Rheological Properties | | | | | | |
| 215° C., 0.5 Rad/Sec | | | | | | |
| G" [kPa] | 16.0 | 16.4 | 14.8 | 14.0 | 16.3 | 15.8 |
| G' [kPa] | 43.9 | 46.6 | 43.9 | 42.9 | 46.5 | 47.8 |
| G* [kPa] | 46.7 | 49.4 | 46.4 | 45.1 | 49.2 | 50.4 |
| Eta" [Pa · s] | 88797 | 94328 | 88898 | 86759 | 94041 | 96784 |
| Eta' [Pa · s] | 32286 | 33248 | 29874 | 28341 | 33017 | 32039 |
| Eta* [Pa · s] | 94563 | 100039 | 93831 | 91378 | 99673 | 101950 |
| 215° C., 175 Rad/Sec | | | | | | |
| G" [kPa] | 36.9 | 39.1 | 38.6 | 37.9 | 39.6 | 42.6 |
| G' [kPa] | 155.6 | 162.5 | 163.2 | 157.0 | 166.6 | 173.7 |
| G* [kPa] | 160.0 | 167.2 | 167.7 | 161.5 | 171.2 | 178.8 |
| Eta" [Pa · s] | 862 | 901 | 904 | 870 | 923 | 962 |
| Eta' [Pa · s] | 205 | 217 | 214 | 210 | 220 | 236 |
| Eta* [Pa · s] | 886 | 926 | 929 | 895 | 949 | 990 |
| 90° C., 1% Strain | | | | | | |
| G" [kPa] | 723 | 731 | 711 | 710 | 756 | 666 |
| G' [kPa] | 8128 | 8105 | 7957 | 7958 | 8269 | 5844 |
| G* [kPa] | 8160 | 8138 | 7988 | 7990 | 8303 | 5885 |
| 90° C., 2% Strain | | | | | | |
| G" [kPa] | 766 | 790 | 775 | 767 | 839 | 627 |
| G' [kPa] | 7568 | 7550 | 7412 | 7376 | 7639 | 5085 |
| G* [kPa] | 7607 | 7591 | 7453 | 7415 | 7685 | 5125 |
| 90° C., 6% Strain | | | | | | |
| G" [kPa] | 1226 | 1293 | 1240 | 1295 | 1300 | 768 |
| G' [kPa] | 5004 | 4916 | 4880 | 4799 | 5010 | 3267 |
| G* [kPa] | 5152 | 5084 | 5036 | 4971 | 5178 | 3359 |

As seen in FIG. 1, the curative masterbatch used impacted the time to the peak in torque when forming the thermoplastic vulcanizates that utilized the "softer" polymeric masterbatch formulations, i.e., the thermoplastic vulcanizates formed with PM-100. Thus, as seen in Table 4 and FIG. 1, the thermoplastic vulcanizates where the stannous chloride was introduced using a masterbatch containing a propylene-based elastomer exhibited decreased time to peak torque as compared to those formed from masterbatches containing to polypropylene. Without being bound by theory, it is believed that the propylene-based elastomers exhibited better compatibility with the rubber component thus allowing for faster curing of the rubber component.

Example 2

Another set of curative masterbatch was produced to test PBE capability for high loading of stannous chloride. Masterbatches were formed from 200 g combined of (i) $SnCl_2$ powder from Mason Corporation, and (ii) either of two PBEs (VM6202 or VM6102), combined in the amounts (wt %) shown in Table 6.

TABLE 6

| | Example 2 formulations | | | | | | | |
|---|---|---|---|---|---|---|---|---|
| | Loading (wt %) | | | | | | | |
| Formulation | 2-1 | 2-2 | 2-3 | 2-4 | 2-5 | 2-6 | 2-7 | 2-8 |
| $SnCl_2$ | 70 | 75 | 80 | 85 | 70 | 75 | 80 | 85 |
| VM6202 | 30 | 25 | 20 | 15 | 0 | 0 | 0 | 0 |
| VM6102 | 0 | 0 | 0 | 0 | 30 | 25 | 20 | 15 |

The 200 g of $SnCl_2$ and PBE were loaded into a Haake Rheocord 90 mixer with a 300 cm³ mixing bowl capacity, ram down. Table 7a shows the mixer's chamber temperature to set point, rotor RPM, and filling time for each masterbatch formulation. Table 7b indicates the process parameters measured during mixing, mixing time, and observations regarding the formation of the masterbatch in the Haake mixer.

TABLE 7a

| | Example 2 mixer settings | | | | | | | |
|---|---|---|---|---|---|---|---|---|
| Sample | 2-1 | 2-2 | 2-3 | 2-4 | 2-5 | 2-6 | 2-7 | 2-8 |
| chamber temp. set (° C.) | 130 | 130 | 130 | 130 | 130 | 140 | 140 | 140 |
| Rotor (rpm) | 50 | 50 | 50 | 50 | 50 | 70 | 70 to 100 | 100-150 |
| Filling time (sec) | 75 | <40 | <20 | <20 | <20 | <20 | <20 | <20 |

TABLE 7b

Example 2 mixing parameters and observations

| Process Data | Sample | | | | | | | |
|---|---|---|---|---|---|---|---|---|
| | 2-1 | 2-2 | 2-3 | 2-4 | 2-5 | 2-6 | 2-7 | 2-8 |
| Temp. after 1 min (° C.) | — | 113 | — | 118 | 116 | 126 | 127 | 146 |
| Torque after 1 min (N*m) | 0.875 | 0.830 | — | 0.400 | 0.700 | 0.600 | 0.100 | 0.100 |
| Powder incorporation temp. (° C.) | — | — | — | — | 131 | 135 | 145 | 164 |
| Powder incorporation time (min) | <2 | 1.5 | 1.5 | 1.5 | 4.0 | 2.5 | 6.0 | 16.0 |
| Torque at incorporation start (N*m) | — | — | 4-5 | 0.8-1.5 | 5-8 | 5-8 | 2.6 | 6-8 |
| Total mixing time (min) | 4.0 | 4.0 | 4.0 | 4.0 | 6.0 | 6.0 | 8.0 | 19.0 |
| Final torque (N*m) | 5 | — | 4.5-5 | 2.9-4 | 8-12 | 6-9 | 4-7 | 9-14 |
| Final melt temp. (° C.) | 117 | — | 127 | 127 | 134 | 142 | 147 | 173 |
| Final rotor rpm | 50 | 50 | 50 | 50 | 50 | 70 | 100 | 150 |
| Melting/ blending efficiency | Powder easily blended | Powder easily blended | Becoming more difficult | Poorly dispersed | Difficult compared to VM6202 | More difficult than VM6202 | More difficult than VM6202 | More difficult than VM6202 |
| Visual Aspect | White, coarse texture | White, coarse texture | White, coarse texture | Some free powder and unmolten pellets | Some free powder | Less white, more affected by temp. and time | Less white, more affected by temp. and time | Less white, more affected by temp. and time |

As shown in Table 7b, lower viscosity PBE (i.e. VM6202, having melt index of 9.1 g/10 min as previously noted) allowed for easier masterbatch formation than higher viscosity PBE (VM6102, having melt index of 1.4 g/10 min as previously noted). However, even for the lower viscosity VM6202 PBE, poor results were found at the 85% $SnCl_2$ loading level. Nonetheless, VM6202 provided acceptable processability and final masterbatch pellets for up to 80% $SnCl_2$ loading. Furthermore, the short incorporation times in the masterbatch formation may advantageously provide energy savings.

Example 3

VM6202FL was used to make $SnCl_2$ masterbatch on a larger scale as compared to Example 2, using a Leistritz twin screw compound extruder, model LSM 34 GL with a screw diameter of 34 mm and an L/D 36. This was combined with a 3×3 mm orifice strand die and a CF Sheer & CIE, model SGS 50-E strand pelletizer. For each of three runs (runs 3-1, 3-2, 3-3 as reported in Table 8 below), the $SnCl_2$ powder and VM6202FL were loaded into the Leistritz extruder via a cooled hopper, in the weight ratios indicated for each run in Table 8. The relevant configurations of the Leistritz extruder for each run, including temperature profiles in the compounder, melt temperatures and pressure at the exit die, etc., are shown below in Table 8. Upon exiting the Leistritz compounder through the die, the masterbatch was pelletized from the strands after passing through the cooling water bath maintained at mains water temperature (approximately 10-13° C.). The cooling water contained calcium stearate solution at 150 cc/53 L of water (Ligafluid 25 CW FC supplied by Peter Grevand Nederland C V) to prevent pellet agglomeration.

As shown in Table 8, each of the three runs targeted different $SnCl_2$ loading in the VM6202FL, specifically 75 wt %, 80 wt %, and 85 wt %, respectively. It should be noted that Run 3-3 targeting 85% $SnCl_2$ loading, failed due to insufficient melt strength for strand cutting. It is believed that the use of underwater pelletizing could solve this problem, thereby allowing for 85% or higher filler loading. Further, in Table 8:

TABLE 8

Example 3 masterbatch compounding parameters

| Run Number | 3-1 | 3-2 | 3-3 |
|---|---|---|---|
| Blend Composition (wt %) | | | |
| Vistamaxx 6202FL | 25.0 | 20.0 | 15.0 |
| Mason Corporation SnCl2 | 75.0 | 80.0 | 85 |
| Total | 100 | 100 | 100 |
| Strand Die | 3 × 3 mm | 3 × 3 mm | 3 × 3 mm |
| Compounding Conditions | | | |
| Cooled Hopper Piece | yes | yes | yes |
| Feed Rate (Kg/hr) | 10 | 10 | 10 |
| Screw Speed (rpm) | 200 | 200 | 200 |
| Power Consumption (amps) | 7 | 5-6 | (process failed) |
| Temperature Profile (° C.) | | | |
| ZONE NUMBER 1 | 109 | 110 | 110 |
| 2 | 120 | 119 | 119 |
| 3 | 130 | 130 | 130 |

TABLE 8-continued

Example 3 masterbatch compounding parameters

| Run Number | 3-1 | 3-2 | 3-3 |
|---|---|---|---|
| 4 | 131 | 130 | 130 |
| 5 | 130 | 130 | 130 |
| 6 | 131 | 132 | 132 |
| 7 (open vent) | 120 | 121 (closed) | 121 (closed) |
| 8 | 120 | 120 | 120 |
| 9 | 120 | 120 | 120 |
| 10 (Die/Plate) | 120 | 120 | 120 |
| Melt Temperatures at Die (° C.) | | | |
| Measured just before entry into the die (T2) | 116-119 | 113 | — |
| Measured in melt stream within die head (T3) | 141 | 131 | |
| Strand Cut | Y | Y | Y |
| Melt Pressure in Die | 46-54 | 35-37 | — |
| QUANTITY COLLECTED (Kg) | 22 kg | 15-20 kg | FAILED |

Thus, 22 kg of 75 wt % stannous chloride in 25 wt % VM6202FL (run 3-1) and approximately 17.5 kg of 80/20 wt % masterbatch (run 3-2) were collected.

Example 4

Two sets of thermoplastic vulcanizate samples (samples TPV-4-1 and TPV-4-2) were formed using the $SnCl_2$ masterbatches produced in Run 3-1 and Run 3-3 of Example 3, respectively. Thus, Sample TPV-4-1 was made using 75/25 wt % stannous chloride masterbatch, and Sample TPV-4-2 was made using 80/20 wt % stannous chloride masterbatch. Each stannous chloride masterbatch was charged into a ZSK 160 vented twin screw compounding extruder running at 330 rpm along with base polymers and other additives. Each masterbatch was preblended in the initial sections of the barrel prior to the addition of the curing resin and then process oil further down the line. After further mixing, the product was pelletised through a multi orifice strand die using an underwater die face cutter. The pellets were then dried and bagged off. Table 9 below reports the set point temperatures in each zone of the extruder's barrel during processing for each TPV formed, as well as the die set point temperature.

TABLE 9

Compounding extruder barrel temperature set points

| Barrel Section | Temperature (° C.) |
|---|---|
| 2 | 40 |
| 3 | 120 |
| 4 | 100 |
| 5 | 100 |
| 6 | 100 |
| 7 | 120 |
| 8 | 100 |
| 9 | 100 |
| 10 | 100 |
| 11 | 100 |
| 12 | 115 |
| 13 | 135 |
| 14 | 135 |
| 15 | 135 |
| 16 | 160 |
| 17 | 160 |
| 18 | 160 |
| 19 | 160 |

TABLE 9-continued

Compounding extruder barrel temperature set points

| Barrel Section | Temperature (° C.) |
|---|---|
| 20 | 130 |
| 21 | 180 |
| 22 | 130 |
| Die | 210 |

The finished product's properties (Shore A hardness, ultimate tensile stress, elongation at break, Modulus M100, Specific Gravity, LCR Viscosity, and Weight Gain) were compared to the same properties typically observed for Santoprene™ grade 121-67W175, a TPV commercially available from ExxonMobil Chemical Company and having similar composition and method of formation, except for the identity of the $SnCl_2$ masterbatch used. Shore A hardness indicates the TPV's resistance to permanent indentation; ultimate tensile stress indicates the maximum stress the TPV can withstand while being stretched before breakage; elongation at break is the ratio of changed length to original length of the TPV after it has been stretched to breakage; modulus M100 (or 100% elongation) is the to force per unit area required to produce 100% elongation of the TPV; specific gravity is the ratio of the TPV density to water LCR Viscosity is the viscosity measured using a laboratory capillary rheometer (commercially available, e.g., from Dynisco Plastics, 6000 machines and Instron CEAST machines) using the shear stress value obtained at 1200 $s^{-1}$ as the measure after plotting a continuous shear rate curve at 203° C. for shear rates between ~700-5400 $s^{-1}$; and weight gain is a measure of cross-linking in the TPV, whereby a greater amount of IRM No. 3 oil (aliphatic mineral oil) uptake after 24 hours at 121° C. (as indicated by greater weight gain) in the TPV indicates a lesser degree of cross-linking.

As shown in Table 10 below, each such property of TPV-4-1 and TPV-4-2 fell on or near to the target values for the corresponding 121-67W175 grade's properties. The same test methods were used to measure each property of Samples TPV-4-1 and TPV-4-2 as are used to measure each corresponding property of 121-67W175.

TABLE 10

Comparison of Typical Measured Properties

| Property | TPV-4-1 | TPV-4-2 | 121-67W175* |
|---|---|---|---|
| Hardness (Shore A) | 72.4 | 71.9 | 72.7 |
| Ultimate Tensile Stress (MPa) | 7.02 | 6.61 | 7.0 |
| Elongation at Break (%) | 476 | 432 | 474.0 |
| Modulus M100 (MPa) | 2.7 | 2.8 | 2.8 |
| Specific Gravity | 0.97 | 0.988 | .9702 |
| LCR Viscosity (Pa · s) | 73.02 | 74.1 | 76.0 |
| Weight Gain | 87.8 | 85.3 | 89 |

*Reported values are averaged over multiple commercial productions

These results therefore indicate that the high stannous chloride loading provided by PBEs in accordance with embodiments of the present invention permits the use of substantially less carrier resin, while still being readily processable and having no observable detrimental effect on the final product.

Having described the various aspects of the compositions herein, further specific embodiments of the invention include those set forth in the following paragraphs.

Embodiment A: A composition comprising propylene-based elastomer and from about 10 wt % to about 90 wt % stannous chloride, based on the weight of the composition, where the propylene-based elastomer comprises propylene-derived units and 5 to 30 wt % of α-olefin-derived units and where the propylene-based elastomer has a melting temperature of less than 120° C. and a heat of fusion of less than 75 J/g.

Embodiment B: The composition of Embodiment A, wherein the stannous chloride is anhydrous stannous chloride.

Embodiment C: The composition of any one of Embodiments A to B, where the composition comprises from about 40 wt % to about 90 wt % of the stannous chloride based on the total weight of the composition.

Embodiment D: The composition of any one of Embodiments A to C, wherein the composition comprises less than 25 wt %, or less than 5 wt %, or less than 1 wt %, of material other than the stannous chloride and the propylene-based elastomer.

Embodiment E: The composition of any one of Embodiments A to C, wherein the composition consists essentially of the stannous chloride and the propylene-based elastomer.

Embodiment F: A process for making a thermoplastic vulcanizate, the process comprising the steps of: (a) introducing a vulcanizable rubber to a reactor; (b) introducing a thermoplastic resin to the reactor; (c) introducing a masterbatch comprising a propylene-based elastomer and a cure accelerator for a phenolic resin curative to the reactor, where the propylene-based elastomer comprises propylene-derived units and 5 to 30 wt % of α-olefin-derived units and where the propylene-based elastomer has a melting temperature of less than 120° C. and a heat of fusion of less than 75 J/g; (d) introducing a phenolic resin curative to the reactor; and (e) dynamically vulcanizing the rubber with the phenolic resin curative in the presence of the cure accelerator and the thermoplastic resin.

Embodiment G: The method of Embodiment F, wherein the step of vulcanizing occurs at a temperature above the melt temperature of the thermoplastic resin.

Embodiment H: A method for making a thermoplastic vulcanizate, the method comprising the steps of: (a) mixing a vulcanizable rubber and a thermoplastic resin above the melt temperature of the thermoplastic resin to form a molten mass; (b) adding a masterbatch comprising a propylene-based elastomer and a cure accelerator to the molten mass, where the propylene-based elastomer comprises propylene-derived units and 5 to 30 wt % of α-olefin-derived units and where the propylene-based elastomer has a melting temperature of less than 120° C. and a heat of fusion of less than 75 J/g; (c) melting the propylene-based elastomer of the masterbatch to thereby disperse the cure accelerator within the molten mass; (d) adding a phenolic curative to the molten mass; and (e) dynamically vulcanizing the rubber with the phenolic resin in the presence of the cure accelerator.

Embodiment I: The method of any one of Embodiments F to H, where the cure accelerator is stannous chloride.

Embodiment J: The method of any one of Embodiments F to I, where the cure accelerator is anhydrous stannous chloride.

Embodiment K: The method of any one of Embodiments F to J, where the masterbatch comprises from about 10 wt % to about 90 wt % cure accelerator based on the total weight of the masterbatch.

Embodiment L: The method of any one of Embodiments F to K, wherein the masterbatch contains less than 25 wt %, or less than 5 wt %, or less than 1 wt %, of material other than the cure accelerator and the propylene-based elastomer.

Embodiment M: The method of any one of Embodiments F to L, wherein the masterbatch consists essentially of the cure accelerator and the propylene-based elastomer.

Embodiment N: The method of any one of Embodiments F to M, wherein the masterbatch is charged to the reactor in the form of pellets.

Embodiment O: The method of any one of Embodiments F to N, wherein the thermoplastic resin comprises polypropylene.

Embodiment P: The method of any one of Embodiments F to O, wherein the vulcanizable rubber comprises ethylene-α-olefin-diene copolymer.

Embodiment Q: The method of any one of Embodiments F to P, wherein the thermoplastic vulcanizate has a Shore A hardness of less than 70, or less than 65.

Embodiment R: A method for making a thermoplastic vulcanizate, the method comprising the steps of: adding a ethylene-propylene-diene copolymer to a twin-screw extruder through the feed throat of the extruder; adding polypropylene to the twin-screw extruder through the feed throat of the extruder; mixing, within an initial mix zone, the ethylene-propylene-diene copolymer and the polypropylene at a temperature above the melt temperature of the polypropylene to form a molten mass; charging pellets that include a blend of a propylene-based elastomer and stannous chloride to the twin-screw extruder through an inlet in a barrel downstream of the initial mix zone, where the propylene-based elastomer comprises propylene-derived units and 5 to 30 wt % of α-olefin-derived units and where the propylene-based elastomer has a melting temperature of less than 120° C. and a heat of fusion of less than 75 J/g; heating the pellets above the melt temperature of the propylene-based elastomer and mixing the molten pellets with the molten mass; charging a phenolic resin curative to the twin-extruder through an inlet in a barrel downstream of the barrel where the pellets are charged; mixing the phenolic resin with the molten mass while transferring the molten mass through a cure zone where dynamic vulcanization of the ethylene-propylene-diene copolymer takes place to thereby form a thermoplastic vulcanizate; removing the thermoplastic vulcanizate from the twin-screw extruder; cooling the thermoplastic vulcanizate; and pelletizing the thermoplastic vulcanizate.

Certain embodiments and features have been described using a set of numerical upper limits and a set of numerical lower limits. Ranges from any lower limit to any upper limit are contemplated unless otherwise indicated. All numerical values are "about" or "approximately" the indicated value, and take into account experimental error and variations that would be expected by persons of ordinary skill in the art.

As used herein, the phrases "substantially no," and "substantially free of" are intended to mean that the subject item is not intentionally used or added in any amount, but may be present in very small amounts existing as impurities resulting from environmental or process conditions.

All patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A composition comprising propylene-based elastomer and from about 10 wt % to about 90 wt % stannous chloride, based on the weight of the composition, where the propylene-based elastomer comprises propylene-derived units and 5 to 30 wt % of α-olefin-derived units and where the propylene-based elastomer has a melting temperature of less than 120° C. and a heat of fusion of less than 75 J/g.

2. A process for making a thermoplastic vulcanizate comprising the composition of claim 1, the process comprising:
   (a) introducing a vulcanizable rubber to a reactor;
   (b) introducing a thermoplastic resin to the reactor;
   (c) introducing a masterbatch comprising the composition of claim 1 to the reactor;
   (d) introducing a phenolic resin curative to the reactor; and
   (e) dynamically vulcanizing the vulcanizable rubber with the phenolic resin curative in the presence of the masterbatch and the thermoplastic resin.

3. The method of claim 2, wherein the step of vulcanizing occurs at a temperature above the melt temperature of the thermoplastic resin.

4. A method for making a thermoplastic vulcanizate comprising the composition of claim 1, the method comprising:
   (a) mixing a vulcanizable rubber and a thermoplastic resin above the melt temperature of the thermoplastic resin to form a molten mass;
   (b) adding a masterbatch comprising the composition of claim 1 to the molten mass;
   (c) melting the propylene-based elastomer of the masterbatch to thereby disperse stannous chloride within the molten mass;
   (d) adding a phenolic curative to the molten mass; and
   (e) dynamically vulcanizing the vulcanizable rubber with the phenolic resin in the presence of the stannous chloride.

5. The method of claim 2, where the masterbatch comprises from about 10 wt % to about 70 wt % stannous chloride based on the total weight of the masterbatch.

6. The method of claim 2, wherein the masterbatch contains less than 25 wt % of material other than the stannous chloride and the propylene-based elastomer.

7. The method of claim 2, wherein the masterbatch contains less than 5 wt % of material other than the stannous chloride and the propylene-based elastomer.

8. The method of claim 2, wherein the masterbatch contains less than 1 wt % of material other than the stannous chloride and the propylene-based elastomer.

9. The method of claim 2, wherein the masterbatch consists essentially of the stannous chloride and the propylene-based elastomer.

10. The method of claim 2, wherein the masterbatch is charged to the reactor in the form of pellets.

11. The method of claim 2, wherein the thermoplastic resin comprises polypropylene.

12. The method of claim 2, wherein the vulcanizable rubber comprises ethylene-α-olefin-diene copolymer.

13. A method for making a thermoplastic vulcanizate comprising the composition of claim 1, the method comprising steps of:
   adding a ethylene-propylene-diene copolymer to a twin-screw extruder through the feed throat of the extruder; adding polypropylene to the twin-screw extruder through the feed throat of the extruder; mixing, within an initial mix zone, the ethylene-propylene-diene copolymer and the polypropylene at a temperature above the melt temperature of the polypropylene to form a molten mass; charging pellets that include the composition of claim 1 to the twin-screw extruder through an inlet in a barrel downstream of the initial mix zone;
   heating the pellets above the melt temperature of the propylene-based elastomer and mixing the molten pellets with the molten mass; charging a phenolic resin curative to the twin-extruder through an inlet in a barrel downstream of the barrel where the pellets are charged; mixing the phenolic resin with the molten mass while transferring the molten mass through a cure zone where dynamic vulcanization of the ethylene-propylene-diene copolymer takes place to thereby form a thermoplastic vulcanizate; removing the thermoplastic vulcanizate from the twin-screw extruder; cooling the thermoplastic vulcanizate; and pelletizing the thermoplastic vulcanizate.

* * * * *